US009434409B2

(12) United States Patent
Singh

(10) Patent No.: US 9,434,409 B2
(45) Date of Patent: Sep. 6, 2016

(54) TIRE LATERAL FORCE MODEL WITH TEMPERATURE ADAPTATION AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 14/244,106

(22) Filed: Apr. 3, 2014

(65) Prior Publication Data
US 2015/0284021 A1    Oct. 8, 2015

(51) Int. Cl.
| B62D 6/00 | (2006.01) |
| B60C 19/00 | (2006.01) |
| B60T 8/1755 | (2006.01) |
| B60C 23/20 | (2006.01) |
| B60T 8/172 | (2006.01) |
| B60W 30/02 | (2012.01) |

(52) U.S. Cl.
CPC ............... *B62D 6/001* (2013.01); *B60C 19/00* (2013.01); *B60C 23/20* (2013.01); *B60T 8/1725* (2013.01); *B60T 8/17552* (2013.01); *B60T 8/17554* (2013.01); *B60W 30/02* (2013.01); *B60C 2019/004* (2013.04); *B60T 2210/12* (2013.01); *B60T 2240/03* (2013.01)

(58) Field of Classification Search
CPC ........... B60T 8/17554; B60T 8/17552; B60C 2019/004
USPC .......................................................... 701/41
See application file for complete search history.

(56) References Cited

U.S. PATENT DOCUMENTS

| 4,805,125 | A  | * | 2/1989 | Beebe .......................... 702/105 |
| 5,297,424 | A  | * | 3/1994 | Sackett ......................... 73/146.5 |
| 5,864,056 | A  | * | 1/1999 | Bell et al. ....................... 73/146 |
| 6,523,586 | B1 |   | 2/2003 | Eromaki et al. ........... 152/154.2 |
| 6,604,036 | B2 | * | 8/2003 | Pallot ............................. 701/48 |
| 6,868,358 | B2 | * | 3/2005 | Brown, Jr. .......... B60C 23/0408 340/442 |
| 6,921,197 | B2 | * | 7/2005 | Aubel et al. .................. 374/141 |
| 7,111,507 | B2 | * | 9/2006 | Fennel ................ B60C 23/0408 374/143 |
| 7,181,366 | B2 | * | 2/2007 | Rimkus ............... B60C 23/0476 702/182 |
| 7,557,694 | B1 |   | 7/2009 | Graham ........................ 340/438 |
| 8,290,756 | B2 |   | 10/2012 | Fevrier et al. ..................... 703/2 |
| 8,718,870 | B2 | * | 5/2014 | Igarashi ........................... 701/36 |

(Continued)

FOREIGN PATENT DOCUMENTS

| DE | 19745734 | 4/1999 | ............ B60C 11/24 |
| DE | 19838638 | 3/2000 | ............... G01L 5/18 |

(Continued)

OTHER PUBLICATIONS

European Search Report received Aug. 7, 2015.

*Primary Examiner* — Behrang Badii
*Assistant Examiner* — Michael Berns
(74) *Attorney, Agent, or Firm* — Edward T. Kennedy

(57) ABSTRACT

A tire-based system and method for adapting the calculation of temperature-sensitive tire characteristics includes one or more tire-mounted temperature sensors mounted to a vehicle tire for measuring a tire temperature at a tire radially outward surface; an algorithmic model adapting one or more temperature-sensitive tire characteristics by the measured tire surface temperature; and vehicle controls using the temperature-sensitive tire characteristics adapted by the tire surface temperature in one or more vehicle control commands.

11 Claims, 26 Drawing Sheets

(56) References Cited

U.S. PATENT DOCUMENTS

| | | | | |
|---|---|---|---|---|
| 9,050,864 B2* | 6/2015 | Singh | ...................... | B60C 23/04 |
| 9,340,211 B1* | 5/2016 | Singh | .................. | B60W 40/068 |
| 2004/0017289 A1* | 1/2004 | Brown, Jr. | .......... | B60C 23/0408 340/442 |
| 2004/0225423 A1* | 11/2004 | Carlson | ................ | B60C 23/061 701/36 |
| 2005/0150283 A1* | 7/2005 | Shick | ...................... | B60C 11/24 73/146 |
| 2005/0242935 A1 | 11/2005 | Kafawy | ...................... | 340/438 |
| 2009/0114322 A1 | 5/2009 | O'Brien | ...................... | 152/154.2 |
| 2011/0313736 A1* | 12/2011 | Johnston | ............. | G06F 17/5009 703/2 |
| 2013/0158798 A1* | 6/2013 | Igarashi | .......................... | 701/37 |
| 2013/0282233 A1* | 10/2013 | Hsia | .................... | B60C 23/0457 701/36 |
| 2014/0366618 A1* | 12/2014 | Singh | ...................... | B60C 23/04 73/146.3 |
| 2016/0146706 A1* | 5/2016 | Singh | .................... | G01M 17/02 73/8 |

FOREIGN PATENT DOCUMENTS

| | | |
|---|---|---|
| DE | 102008052282 A1 | 4/2010 |
| EP | 2612797 A1 | 7/2013 |
| EP | 2722202 A1 | 4/2014 |

\* cited by examiner

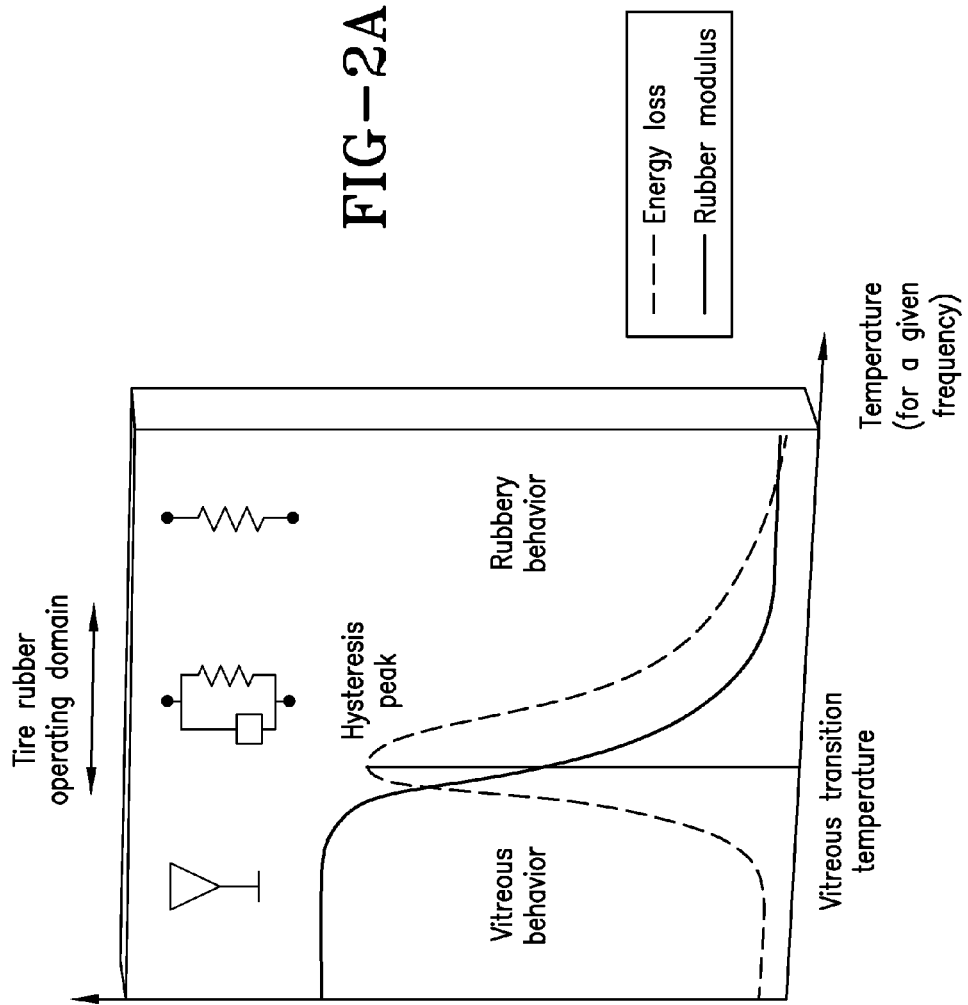

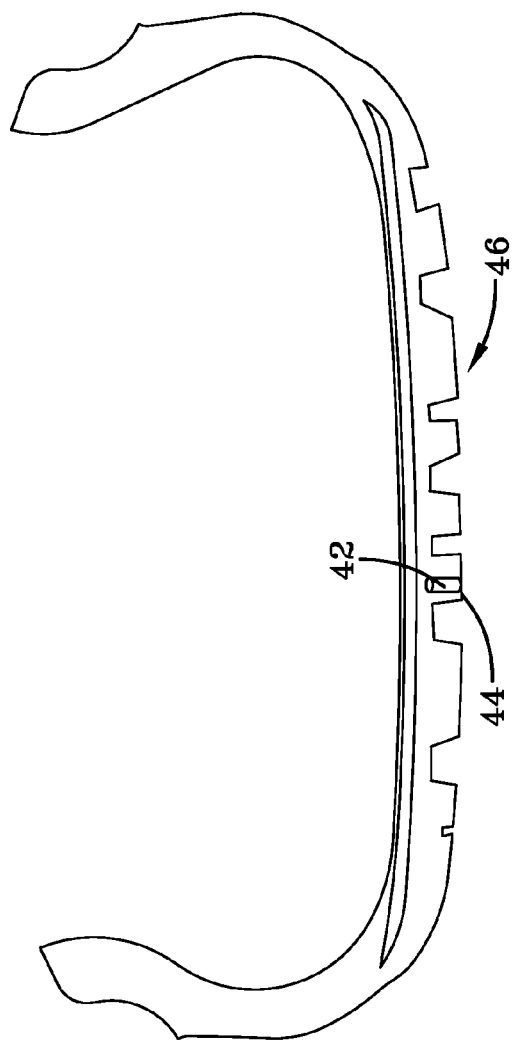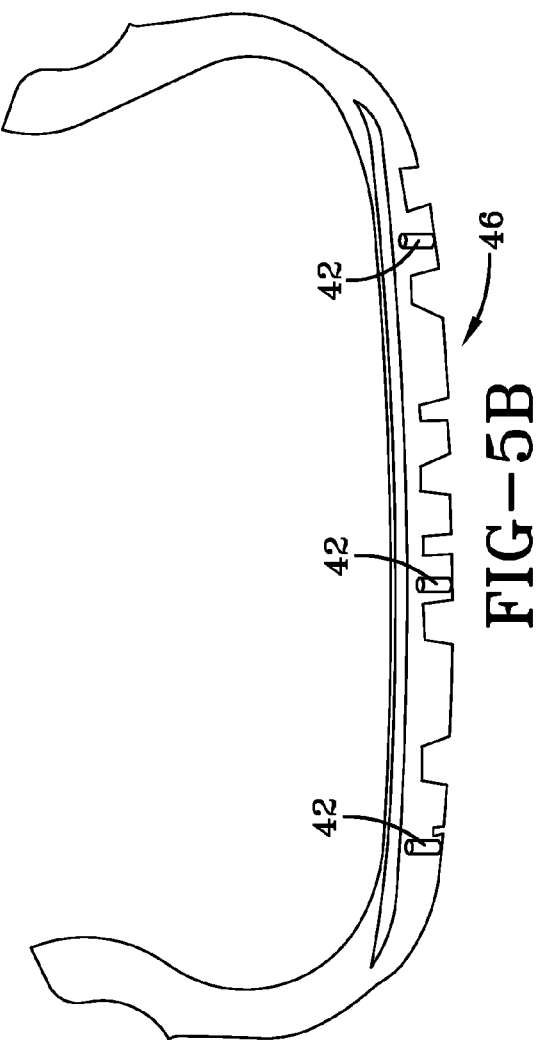

TIRE LATERAL FORCE MODEL WITH TEMPERATURE ADAPTATION AND METHOD

FIELD OF THE INVENTION

The subject invention relates generally to model-based systems for calculating lateral force and, more specifically, to a model-based lateral force calculating system including adaptation factoring.

BACKGROUND OF THE INVENTION

Real-time measurement or calculation of tire-based parameters such as tire cornering stiffness and peak grip level are important for certain vehicle stability control systems such as active front/rear steering input and yaw control. Attainment of a high fidelity tire model with which to compute tire cornering stiffness and peak grip level, however, has proven problematic.

Accordingly, a reliable, robust, high fidelity tire lateral force model and method is desired that incorporates adaptation factoring for greater accuracy.

SUMMARY OF THE INVENTION

According to an aspect of the invention a tire-based system and method for adapting the calculation of temperature-sensitive tire characteristics includes one or more temperature sensors sensor mounted to a vehicle tire for measuring a tire temperature at a tire radially outward surface; an algorithmic model operatively receiving the tire temperature as an input and using the tire temperature in adapting one or more temperature-sensitive tire characteristics; and one or more vehicle controls using the one or more temperature-sensitive tire characteristics adapted by the tire temperature in one or more operative control commands for the vehicle.

In a further aspect, the temperature-sensitive tire characteristic is from the group of tire characteristics: tire cornering stiffness; and tire peak friction coefficient.

A plurality of temperature sensors, in a further aspect, are mounted to respective positions across a tire tread region, and the tire surface temperature is derived as a mean of the temperature combination of measured temperatures from the plurality of temperature sensors.

The system, in another aspect, includes an algorithmic model in the form of a second-order polynomial model capturing the dependencies of the group of tire characteristics to the tire temperature. At least one operative control command for the vehicle uses the tire adaptation model in such control functions as front and rear steering and yaw control.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" or "controller area network" is a vehicle bus standard designed to allow microcontrollers and devices to communicate with each other within a vehicle without a host computer. CAN bus is a message-based protocol, designed specifically for automotive applications.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Recursive least squares (RLS)" means an adaptive filter algorithm which recursively finds the filter coefficients that minimize a weighted linear least squares cost function relating to the input signals.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 2A is a graph demonstrating modulus of elasticity changing with temperature.

FIG. 5A is a cross-sectional representation of a tire fitted with a tread embedded temperature sensing module.

FIG. 5B is a cross-sectional representation of a tire fitted with multiple tread embedded temperature sensing modules.

DETAILED DESCRIPTION OF THE INVENTION

Figure 1:
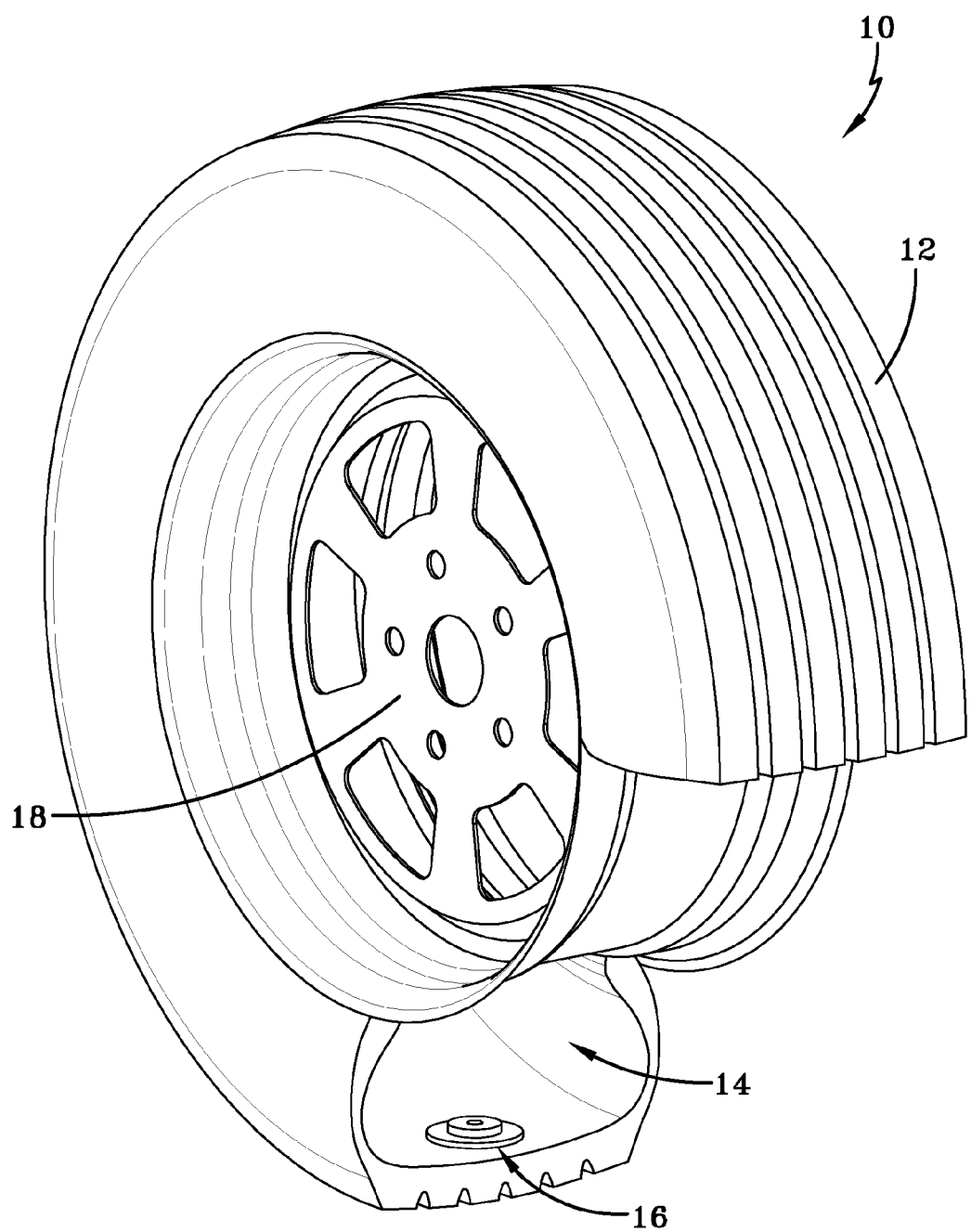
FIG. 1 is a partially sectioned perspective view of a wheel mounted tire having a tire-attached TPMS+Sensor module affixed to a tire inner liner.
Figure 2B:
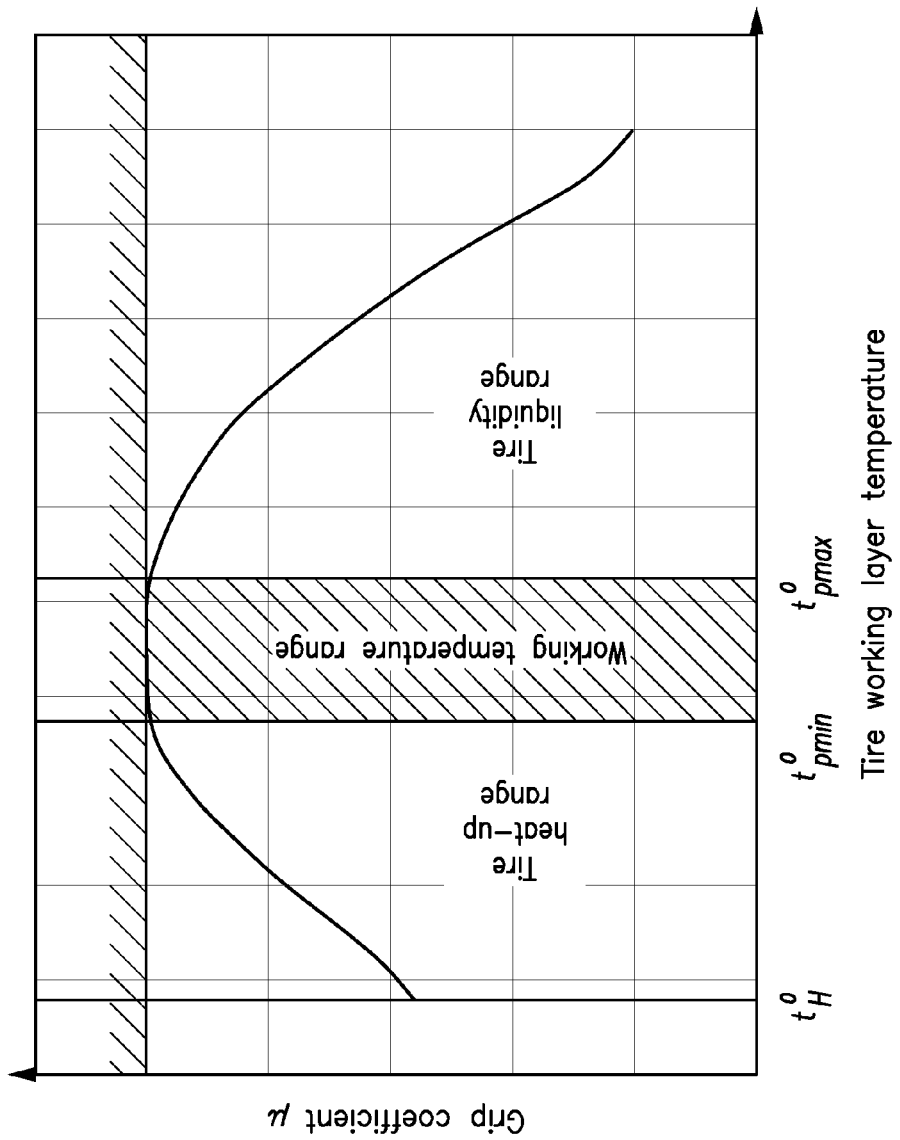
FIG. 2B is a graph showing a tire coefficient of friction changing with temperature.

The subject invention recognizes that tire temperature can change tire characteristics in a variety of ways. Specifically, temperature most heavily influences the forces produced by the tire. The temperature affects the tire's stiffness, and therefore force, in at least two different ways. As the temperature changes, the modulus of elasticity will change, thus changing the stiffness of the tire. In FIG. 2A a graph (rubber modulus vs. temperature) is shown depicting the relationship of energy loss and rubber modulus in the tire rubber operating domain. When tires run hot for extended periods, the pressure may also increase which again changes the tire stiffness. The temperature will also influence the tire's force capability due to change in the coefficient of friction of the tire with changing temperature as seen in the graph of FIG. 2B of friction (grip) coefficient vs. temperature. For these reasons, the subject invention uses tire temperature as an input to a tire model along with the operating inputs of normal load, slip state, camber angel, and vehicle speed.

Figure 3:
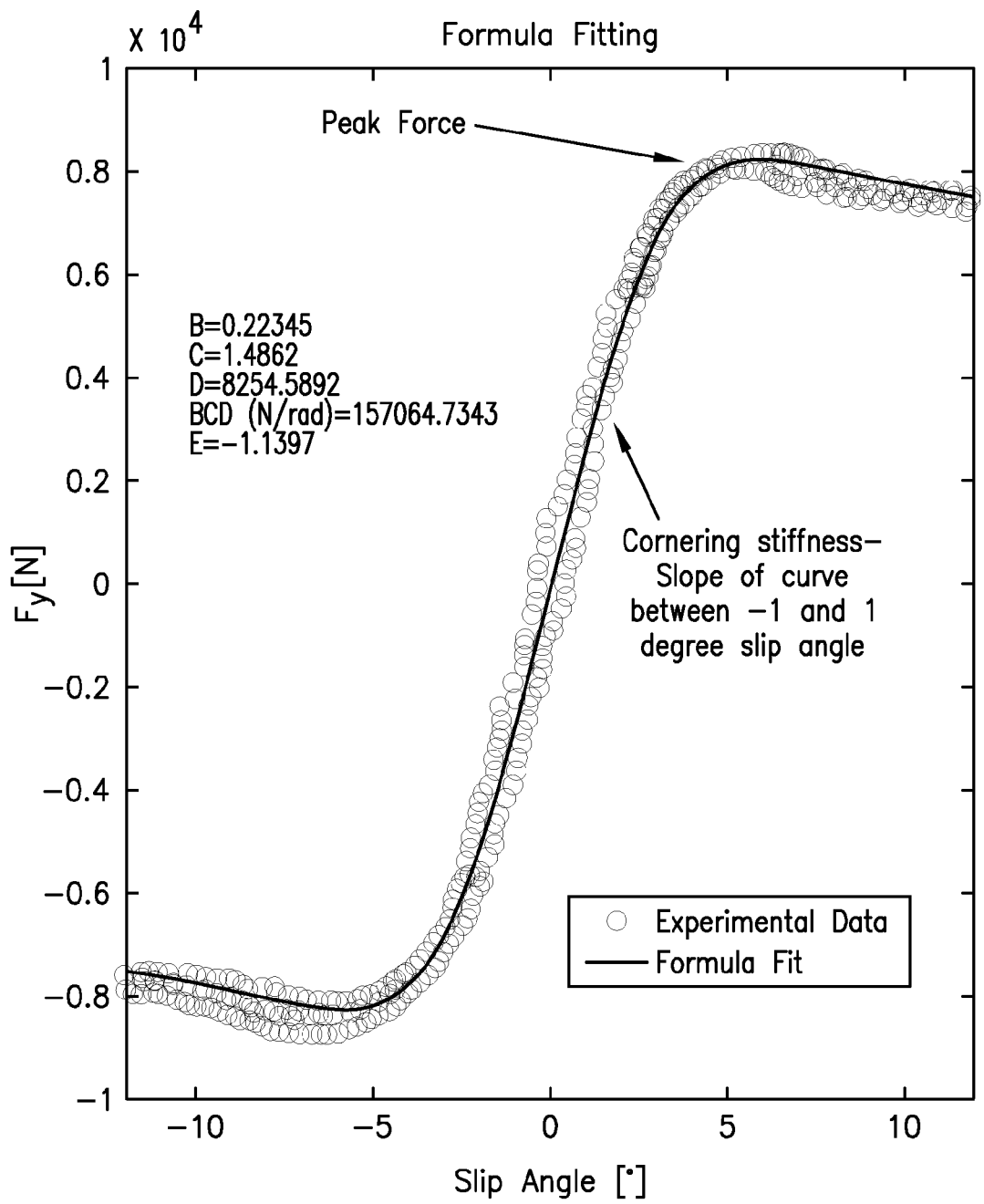
FIG. 3 is a graph showing cornering stiffness plotting lateral force vs. slip angle for experimental data as compared with formula fit.

In FIG. 3, formula fitting of Paceijka Tire Model magic formula (MF) fit to experimental data is shown graphically to illustrate temperature dependency of tire cornering stiffness (CS) and peak friction coefficient (peak force). Peak force is graphed against slip angle with cornering stiffness (CS) representing the slope of the curve between −1 and +1 slip angle. It will be appreciated that tire cornering stiffness (CS) has a high dependency on tire surface temperature. A high bulk temperature implies a lower tread rigidity (more elasticity) which leads to a lower cornering stiffness (CS). Also seen is the high dependency of peak force to tire surface temperature, wherein the coefficient of sliding friction strongly depends on temperature. A high surface temperature leads to lower peak friction coefficient which creates a lower peak force.

Figure 4:
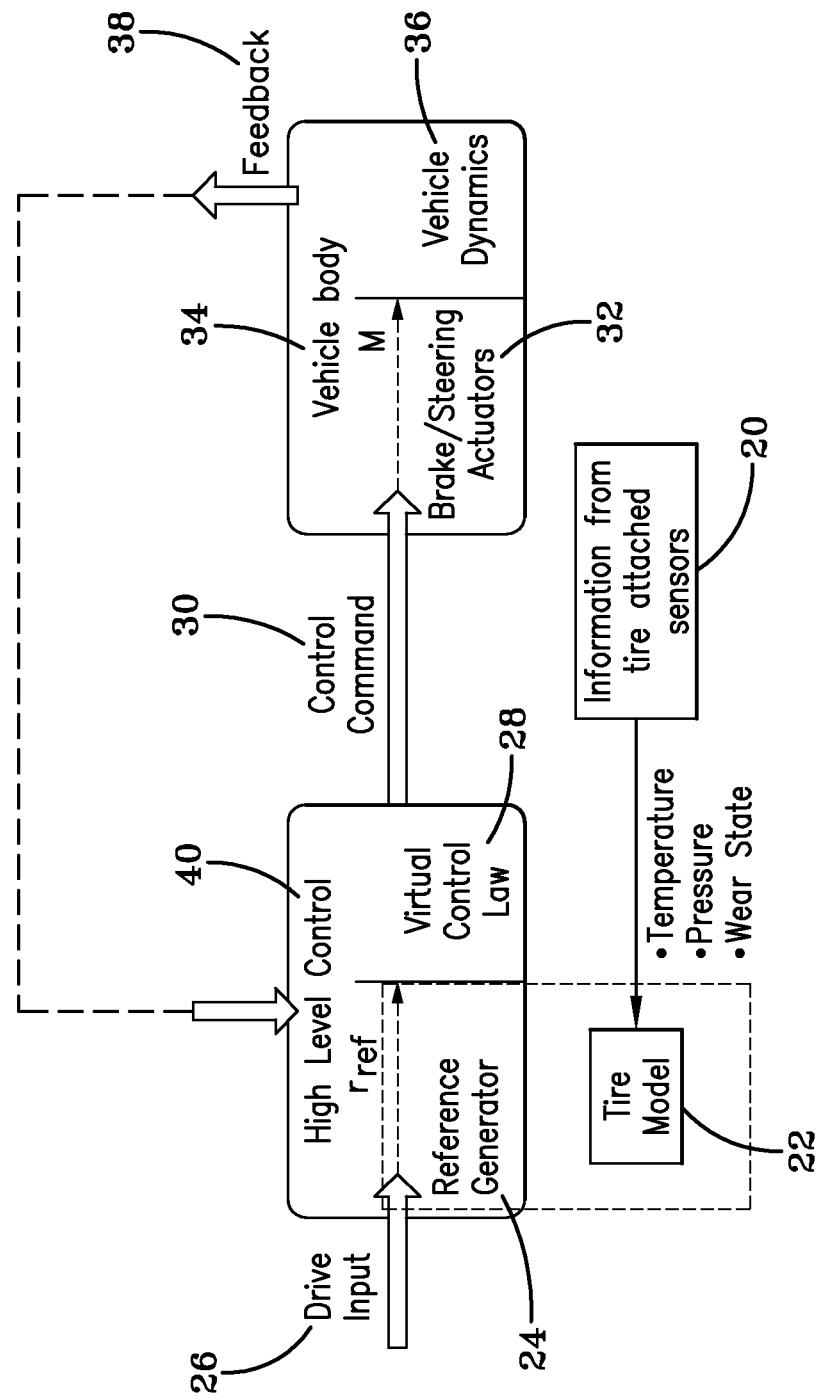
FIG. 4 is a schematic block diagram showing the subject Tire Force Model Adaptation to Information from Tire Attached Sensors.

FIG. 4 represents a reference vehicle model in the control system based on tire characteristics of cornering stiffness and peak grip level. Vehicle stability control command 30 is subject to drive inputs 26 and derived by application of a virtual control law 28. The control command 30 is applied to a vehicle body mass M 34 and controls the brake/steering actuators 32 to the vehicle subject to vehicle dynamics 36. Feedback 38 is used to create the high level control 40 $r_{ref}$. Because the tire parameter characteristics of cornering stiffness and peak grip level within the tire model 22 fluctuate under varying operating conditions of the tire such as temperature change, pressure change, and tire wear state, such tire based input information 20 from tire attached sensors is used to enhance the accuracy of the vehicle stability control system. The use of a high fidelity tire model 22 with temperature/pressure/tire wear state adaptation terms 20 facilitates the online computation of the optimized control commands of active front/rear steering input and yaw control to achieve vehicle stability and safety without degrading driving intentions. Accordingly, the subject invention provides a prediction model to estimate cornering stiffness and the peak grip level at a given tire temperature. As used herein, "tire temperature" refers to the tire surface temperature.

The subject invention system and method utilizes a tread embedded temperature sensing module 42 as shown in FIGS. 5A and 5B, having integrated sensor such as a thermocouple/thermistor and electronics for measuring tire temperature at a radially outward tire surface 44. In FIG. 5A, a single module 42 is used centered within the tire tread region 46 and embedded within a tread block element 48. The temperature sensor within the module 42 and associated electronics for powering the sensor and transmitting temperature data are of a type commercially available. Pending U.S. patent application Ser. No. 13/780,930 filed Feb. 28, 2013, entitled AUTONOMOUS, PLUG-IN WEAR OR ABRASION SENSING SYSTEM, hereby incorporated in its entirety by reference. In the co-pending application, a cylindrical body is used to house a wear sensor, associated electronics and power supply. The sensor is embedded within a tire tread lug or block and senses tread wear. The subject invention replaces a tread wear sensor within the cylindrical body with a temperature sensor such as a thermocouple/thermistor operative to sense the surface temperature of the tire and, more specifically, the tread lug radially outward surface into which the module is embedded. Other types of commercially available thermocouple/thermistor sensors and attachment/location schemes may be used to monitor the temperature at the surface of the tread region of a tire and are within the contemplation of the subject invention.

In FIG. 5B, multiple modules 42 are deployed across the tread region 46, each module embedded within a respective tread lug and each module measuring a radially outward surface temperature. From the multiple temperature sensors within modules 42, an accurate measured temperature input may be obtained and used within the tire model 22 (FIG. 4). The tread embedded temperature sensing modules 42 of FIG. 5B provide an accurate measurement at three locations (centerline, outer shoulder and inner shoulder) and provide temperature measurements that can be averaged across the tire section.

Figure 6:
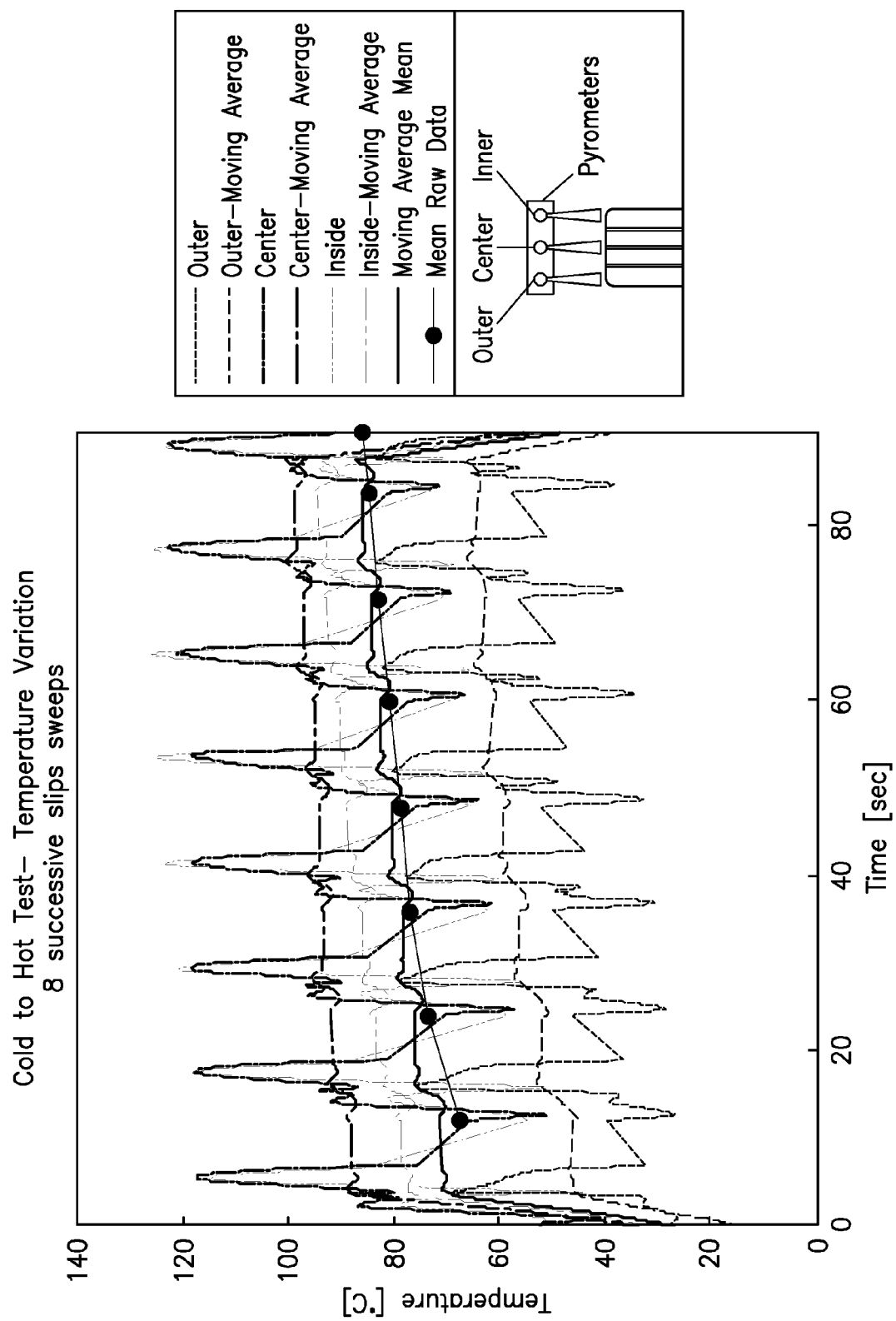
FIG. 6 are graphs of temperature over time in eight successive temperature variation slips sweeps for the multiple sensing module tire configuration of FIG. 5B.
Figure 7:
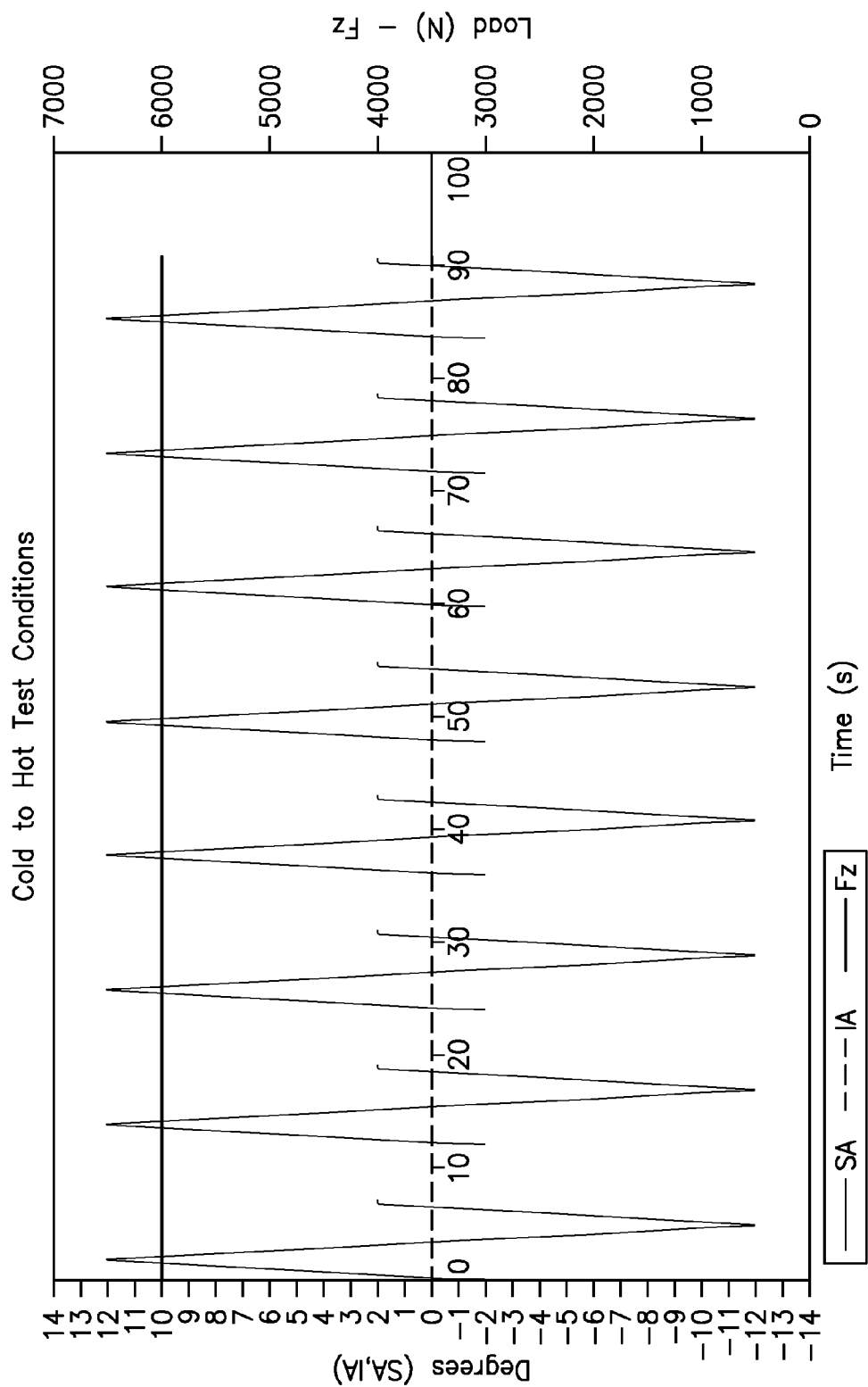
FIG. 7 is a graph reflecting results of a cold to hot test. Slip angle, camber, and load lines are shown over a sweep of cold to hot temperatures.
Figure 8:
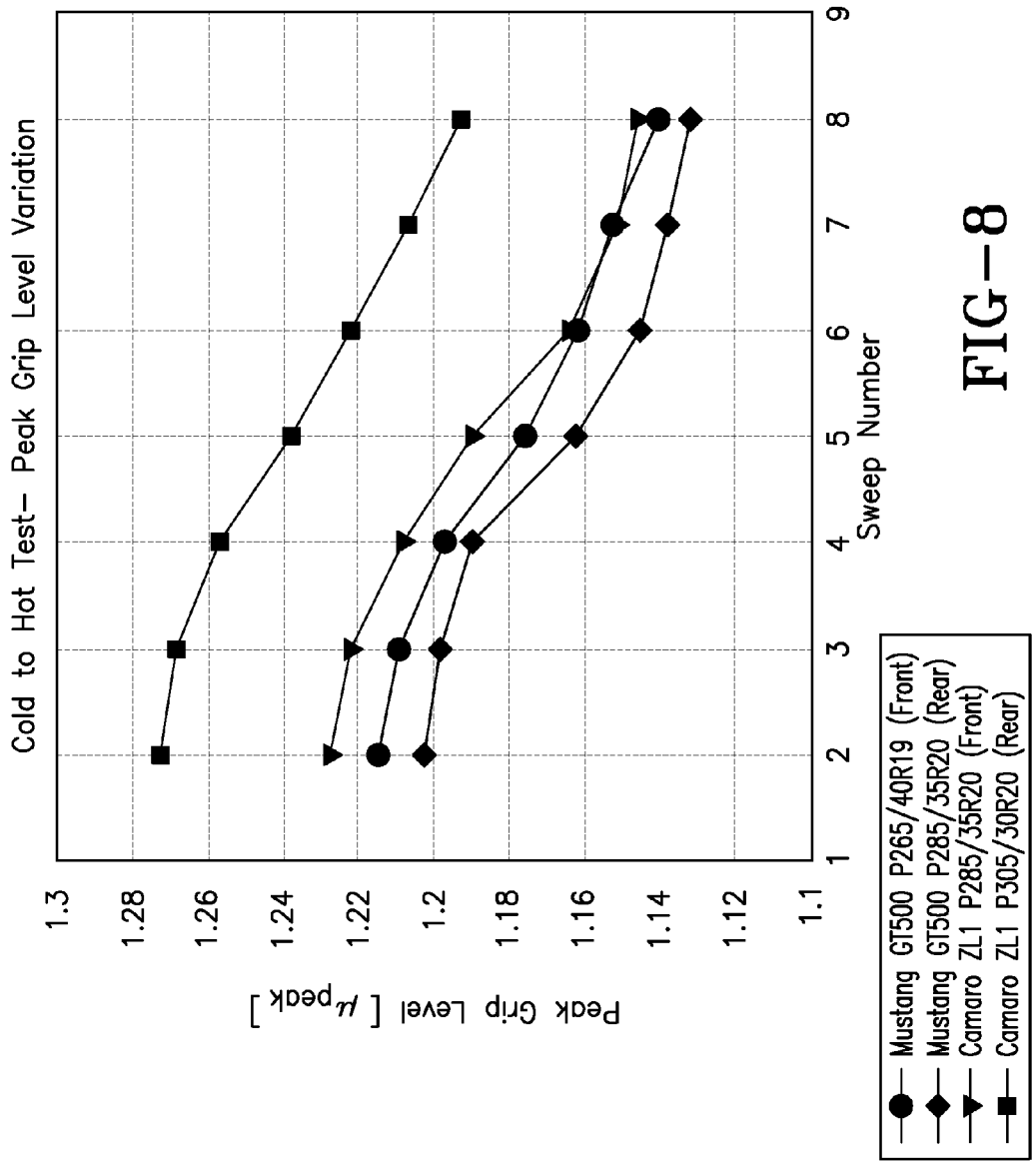
FIG. 8 is a graph of a cold to hot test results showing peak grip level variation for tires from two models of automobiles.
Figure 9:
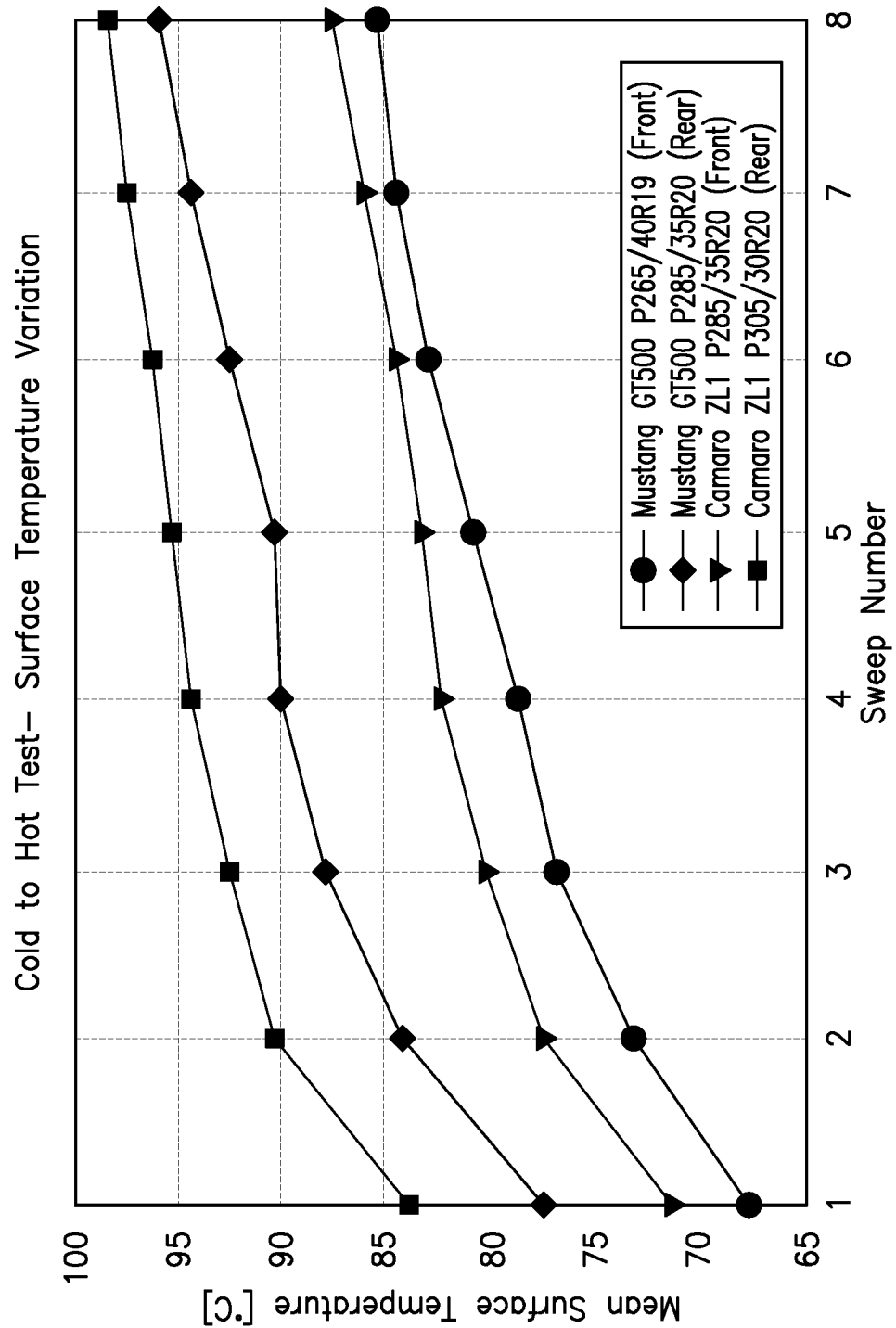
FIG. 9 is a graph of cold to hot test results showing surface temperature variation for the same tires tested.
Figure 10:
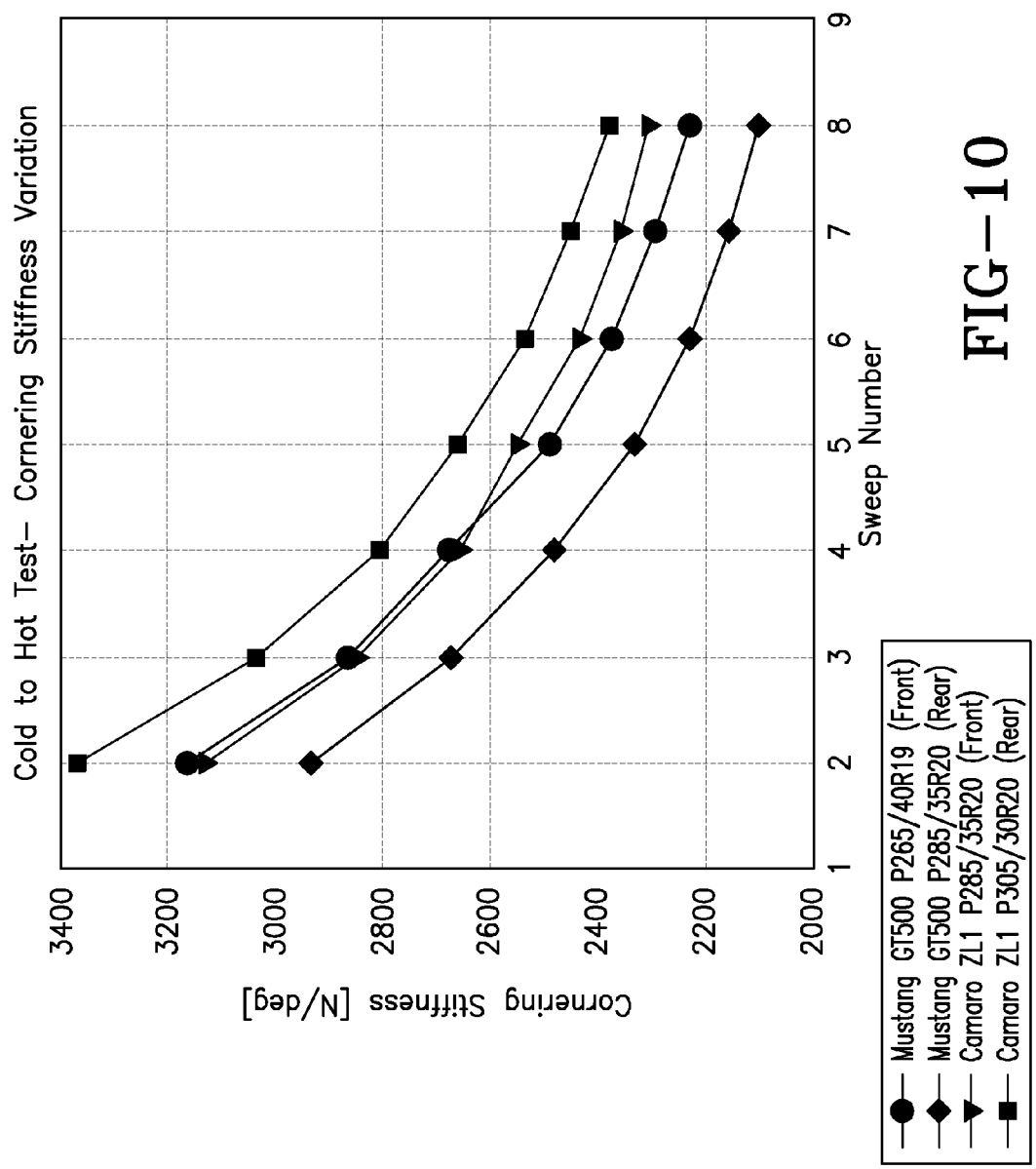
FIG. 10 is a graph of cold to hot test results showing cornering stiffness variation for the same tires tested.

Cold to hot test sweeps of temperature variation were conducted on a Mustang GT500 and a Camaro ZL-1 automobile. The results from such tests are shown in FIG. 6 in the graphs of temperature over time for outer, center and inner pyrometers. Actual measured results of the three pyrometers, moving average for each pyrometer, mean raw data and moving average mean are graphed for comparison purposes. For algorithm development purposes, IR pyrometers were used in lieu of the sensor modules 42 to measure the tire surface temperature at three points across the tire surface. Eight successive slips sweeps were conducted at slip angle of +/−12 degrees, a camber of 0 degrees and a load (N)−Fz at 90 percent reference. FIG. 7 plots slip angle, camber and load Fz over time. For the testing, automobile models Mustang GT500 and Camaro ZL1 were used with front and rear tires as identified in FIG. 8. FIG. 8 shows the graphs for each tire and model tested. Peak grip level [$\mu_{peak}$] for each sweep number is graphed for front and rear tires of each model. In FIG. 9, the cold to hot test results are graphed for surface temperature variation. Mean surface temperature is plotted for each sweep for the front and rear tires of each model. FIG. 10 shows the test results of the cold to hot test for cornering stiffness variation. Cornering stiffness [N/deg] is plotted for front and rear tires of each model tested. From the graphs of FIGS. 8, 9 and 10, it will be seen that changes in peak grip (FIG. 8) and cornering stiffness (FIG. 10) correlate in the sweep test with cold to hot changes in mean surface temperature as reflected in FIG. 9.

Figure 11:
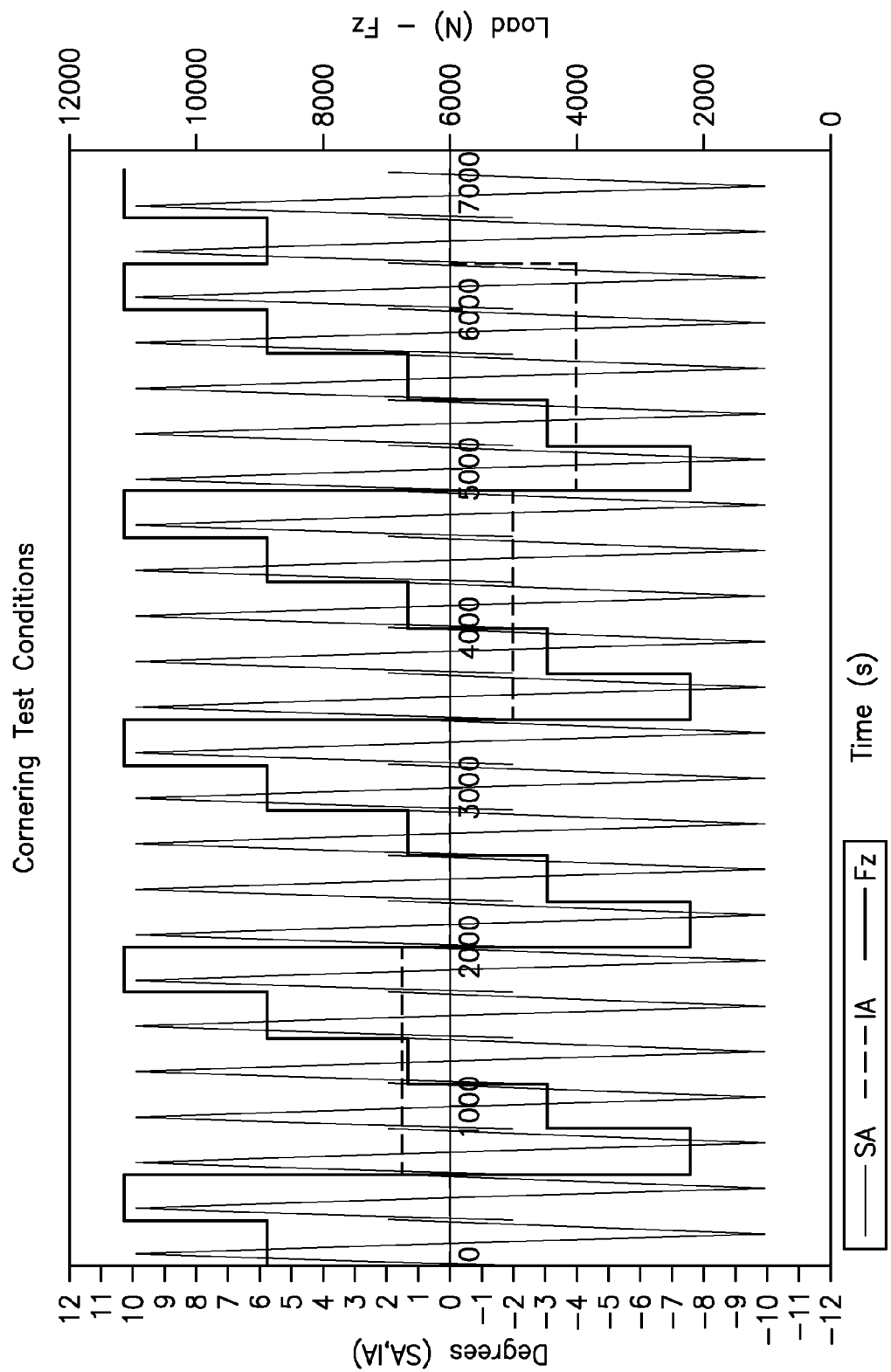
FIG. 11 is a graph showing cornering test results in a test matrix.
Figure 12A:
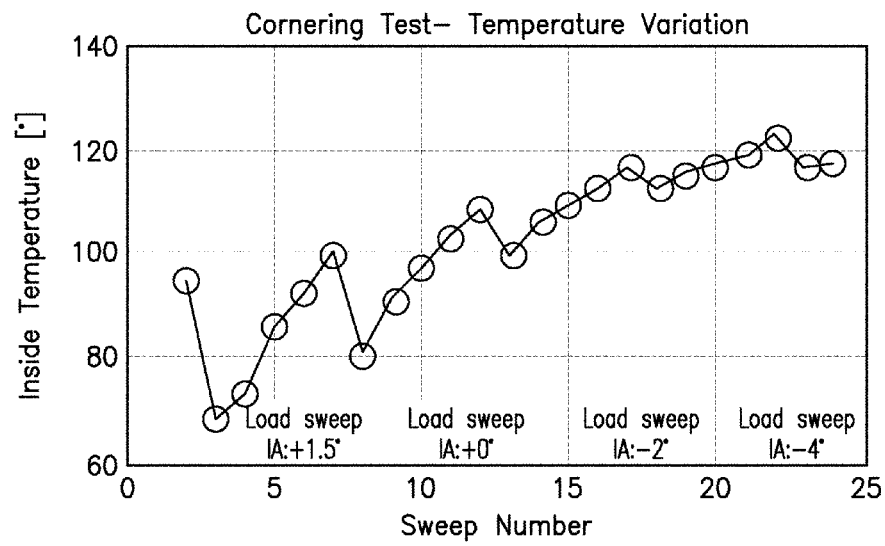
FIG. 12A is a graph of cornering test results showing inside temperature variation over multiple differentiated loadings.
Figure 12B:
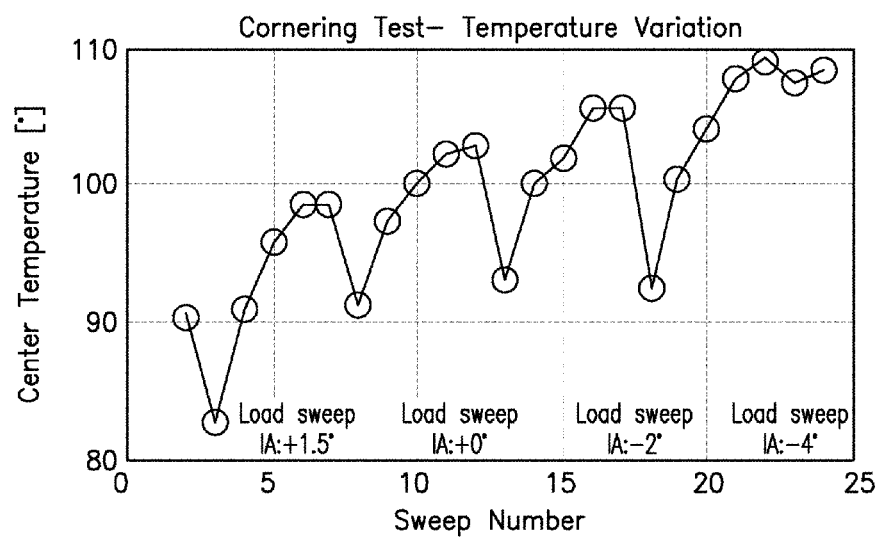
FIG. 12B is a graph of cornering test results showing center temperature variation over multiple differentiated loadings.
Figure 12C:
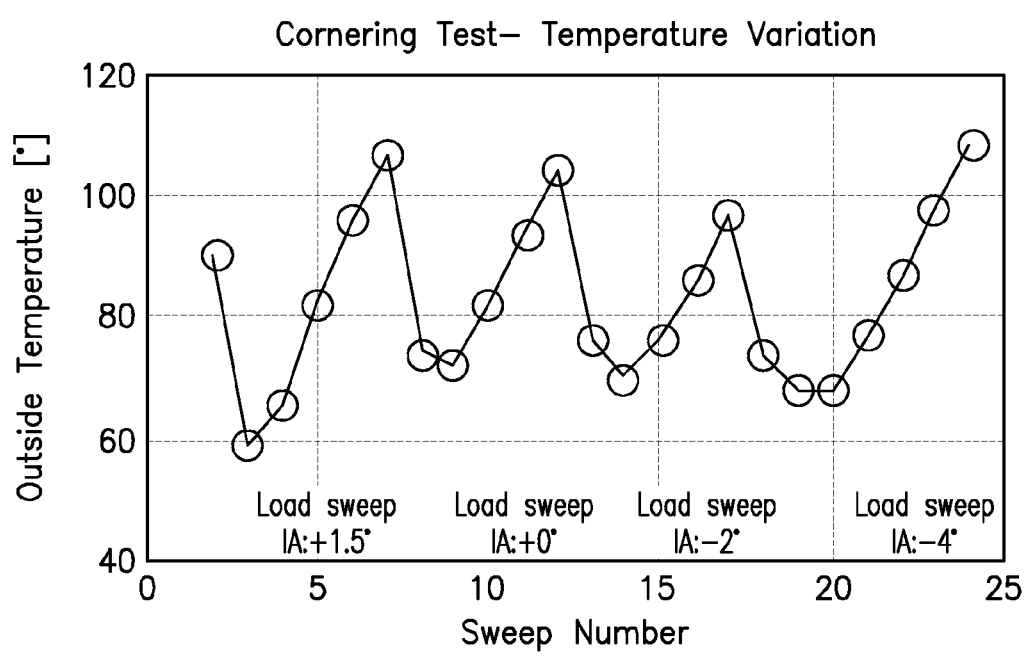
FIG. 12C is a graph of cornering test results showing outside temperature variation over multiple differentiated loadings.
Figure 13:
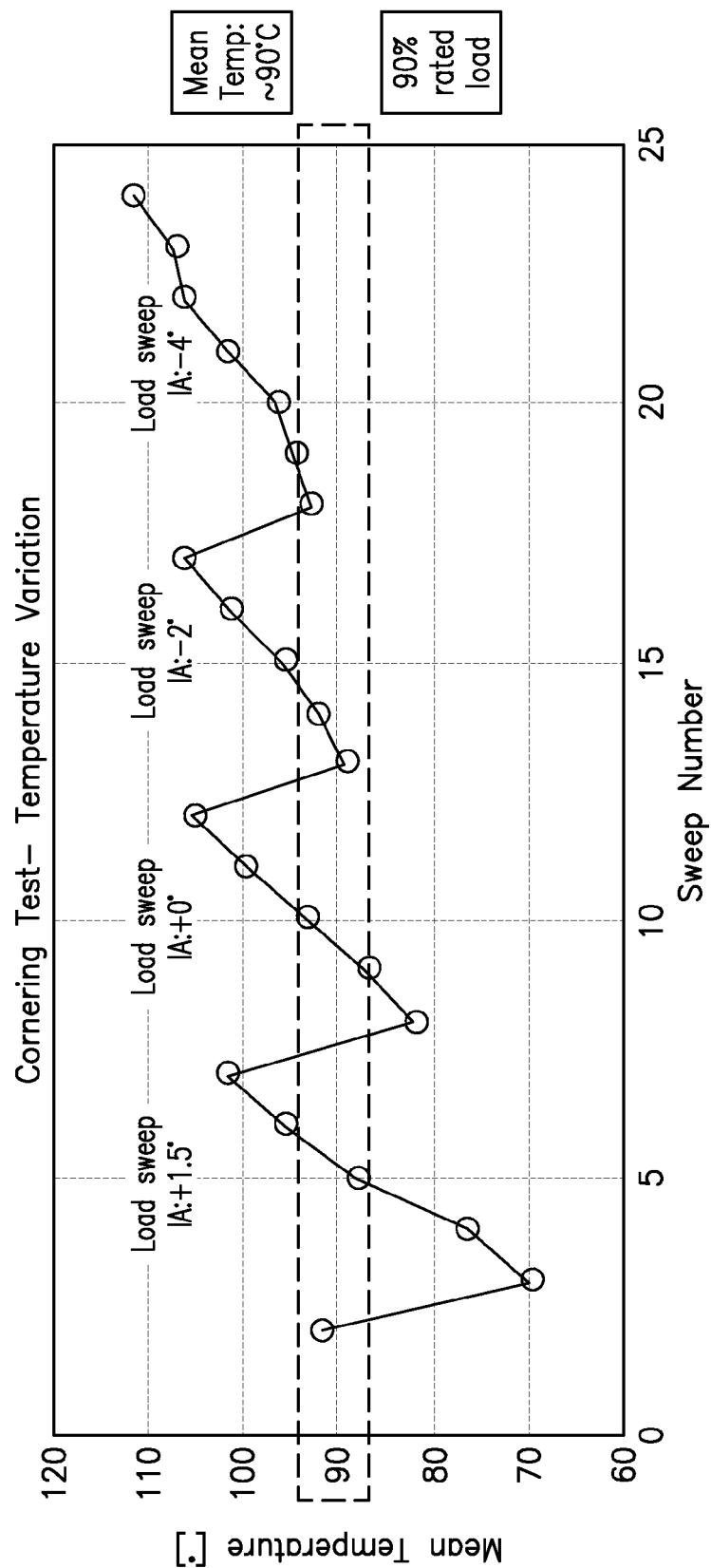
FIG. 13 is a graph of cornering test temperature variation.

Referring to FIG. 11, a Cornering Test was conducted under the follow conditions:
Fz: 500, 1000, 1500, 2000, 2500 lbs.
Camber: +1.5. 0. −2, −4
Slip Angle: +/−10 degrees
Tires: Same as previously identified in the Cold to Hot Test The cornering test conditions consisted of five loads and four camber angles along with an additional four sweeps (two at the test start and two at the test end) used as a give-up test. The results of the cornering test are indicated in the graph of FIG. 11, plotting slip angle and camber angle and load over time. Three temperature sensors were mounted to the front tire of the Mustang GT400 vehicle, representing inside, center and outside tread locations. The cornering test temperature variation test results for the three sensor locations are shown in FIGS. 12A, 12B and 12C respectively, plotting temperature for each load sweep. FIG. 13 gives the cornering test temperature results as mean temperature over the sweep iterations. The mean temperature detected by the three sensors was approximately 90° C. at a 90 percent rated load.

Figure 14A:
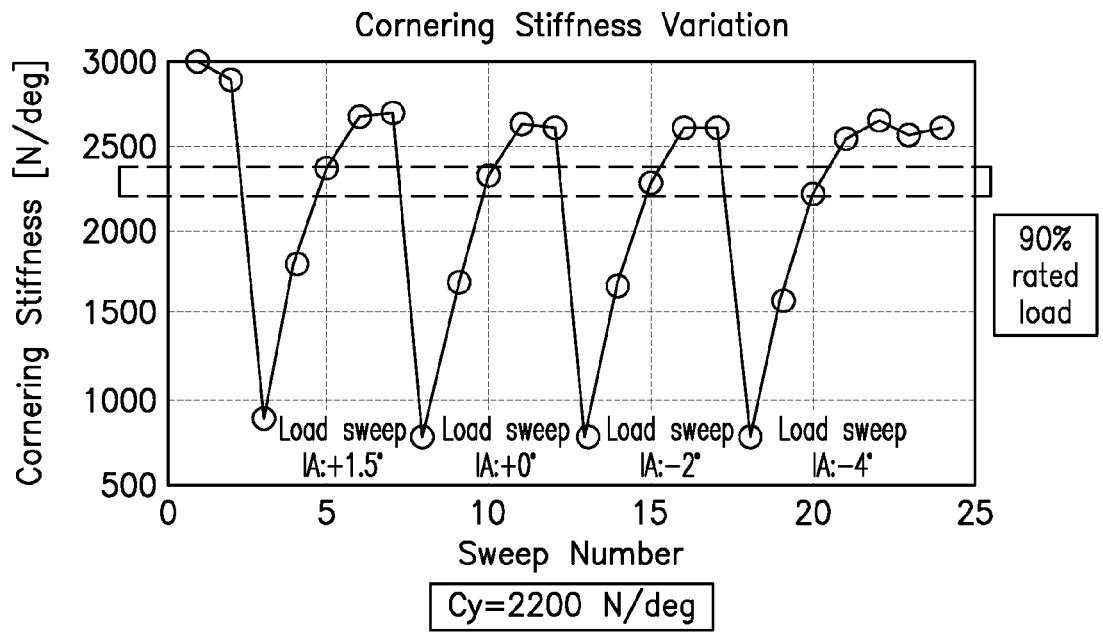
FIGS. 14A and 14B are test result graphs respectively showing cornering stiffness variation and peak grip level variation through a series of load sweeps.
Figure 14B:
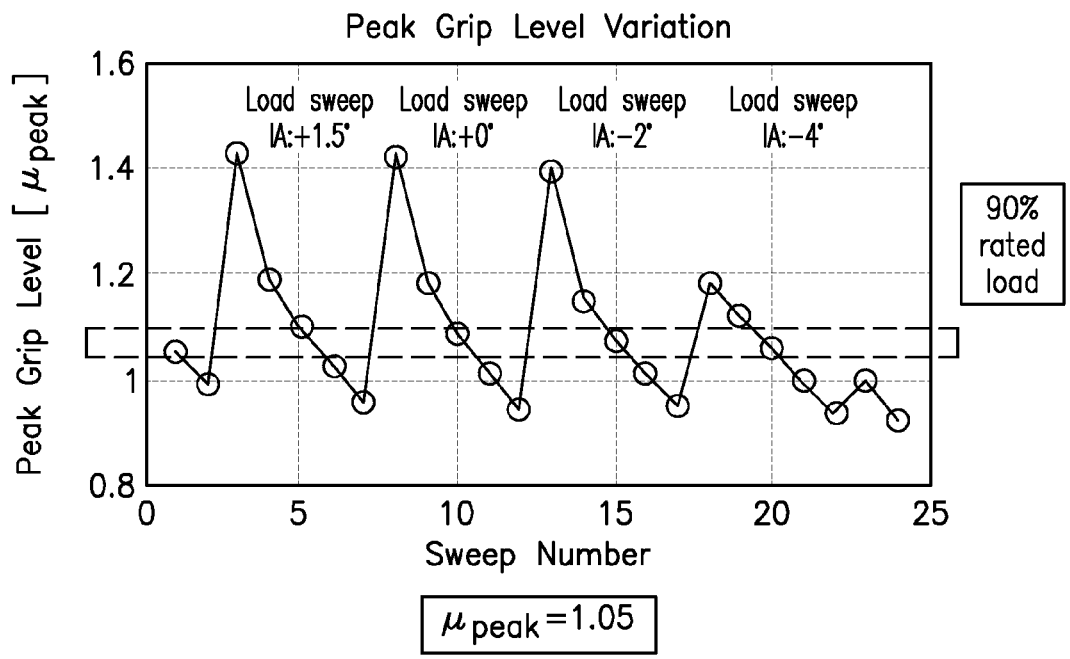
Figure 15A:
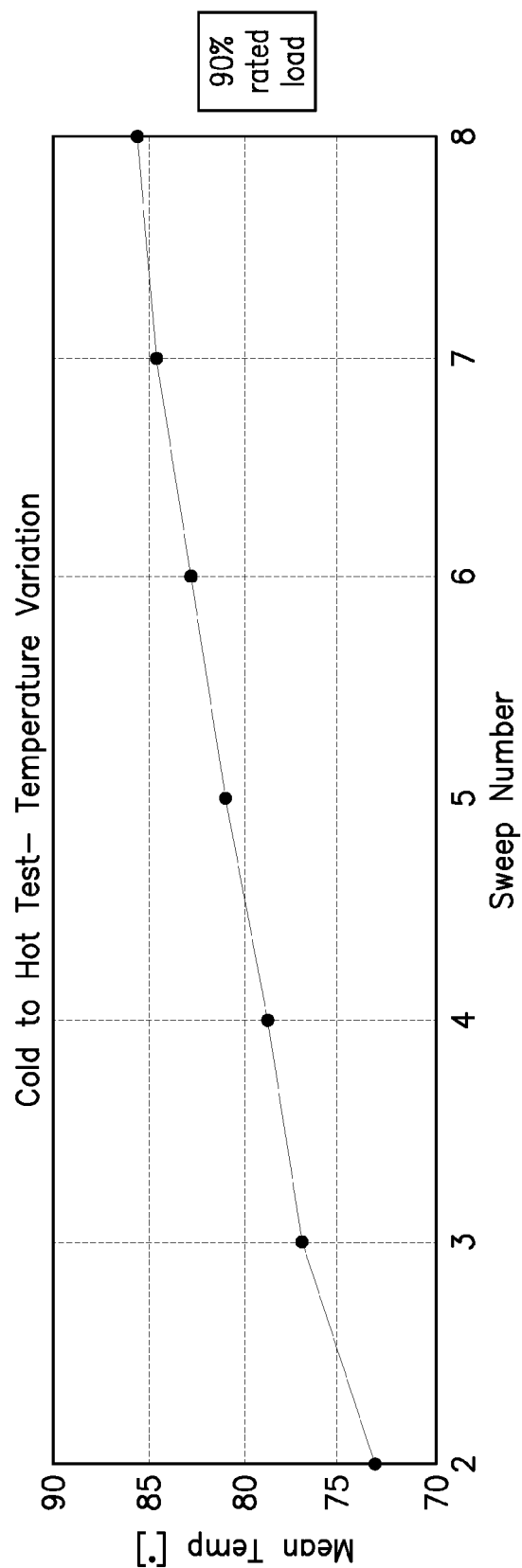
FIG. 15A through 15C are test result graphs respectively showing cold to hot temperature variation, cornering stiffness, and peak grip level variation.
Figure 15B:
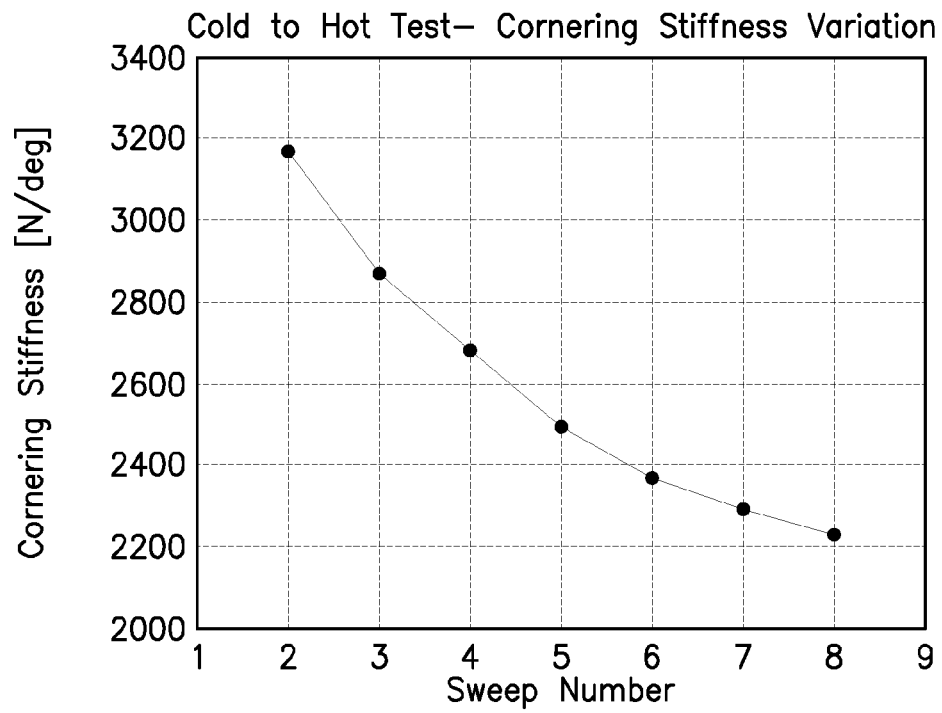
Figure 15C:
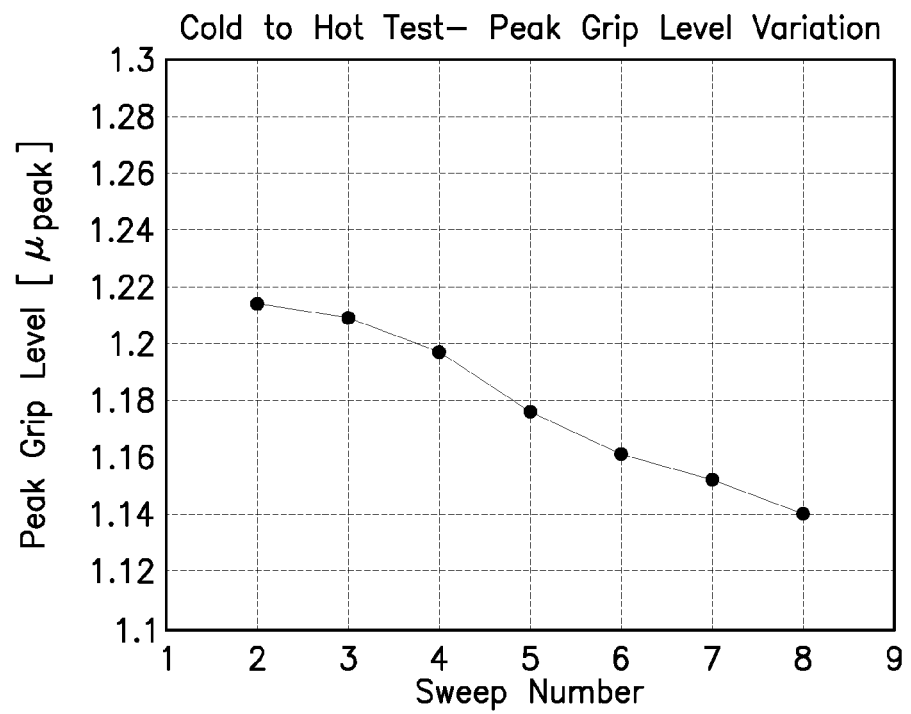

The test further produced cornering stiffness variation and peak grip level variation results as reflected in FIGS. 14A and 14B, respectively. In FIG. 14A the cornering stiffness over the sweep iterations at 90 percent rated load yielded Cy=2200 N/deg. In FIG. 14B the peak grip level variation at 90 percent rated load yielded a $\mu_{peak}$ of 1.05. FIGS. 15A, 15B and 15C show the cold to hot test results for temperature variation, cornering stiffness variation, and peak grip level variation for a front P265/40R 19 on a Mustang GT500 at 90 percent rated load.

The Peak Grip Level-Temperature Variation Model used in predicting Peak Mu Vs. Temp is based on the following:

$$f(x)=p1*x^2+p2*x+p3$$

Figure 16:
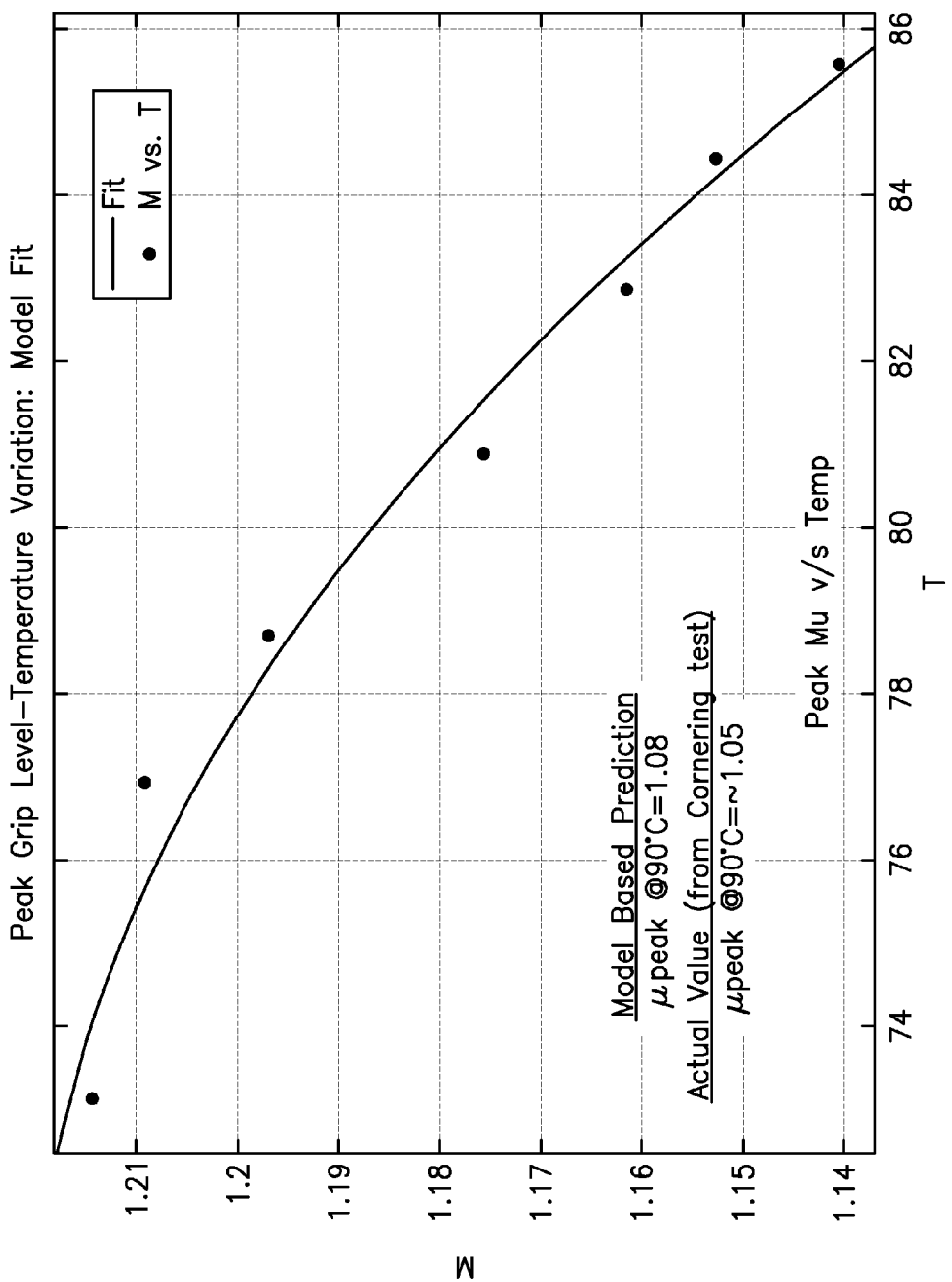
FIG. 16 is a graph showing peak grip level-temperature variation model fit for the conducted test.
Figure 17:
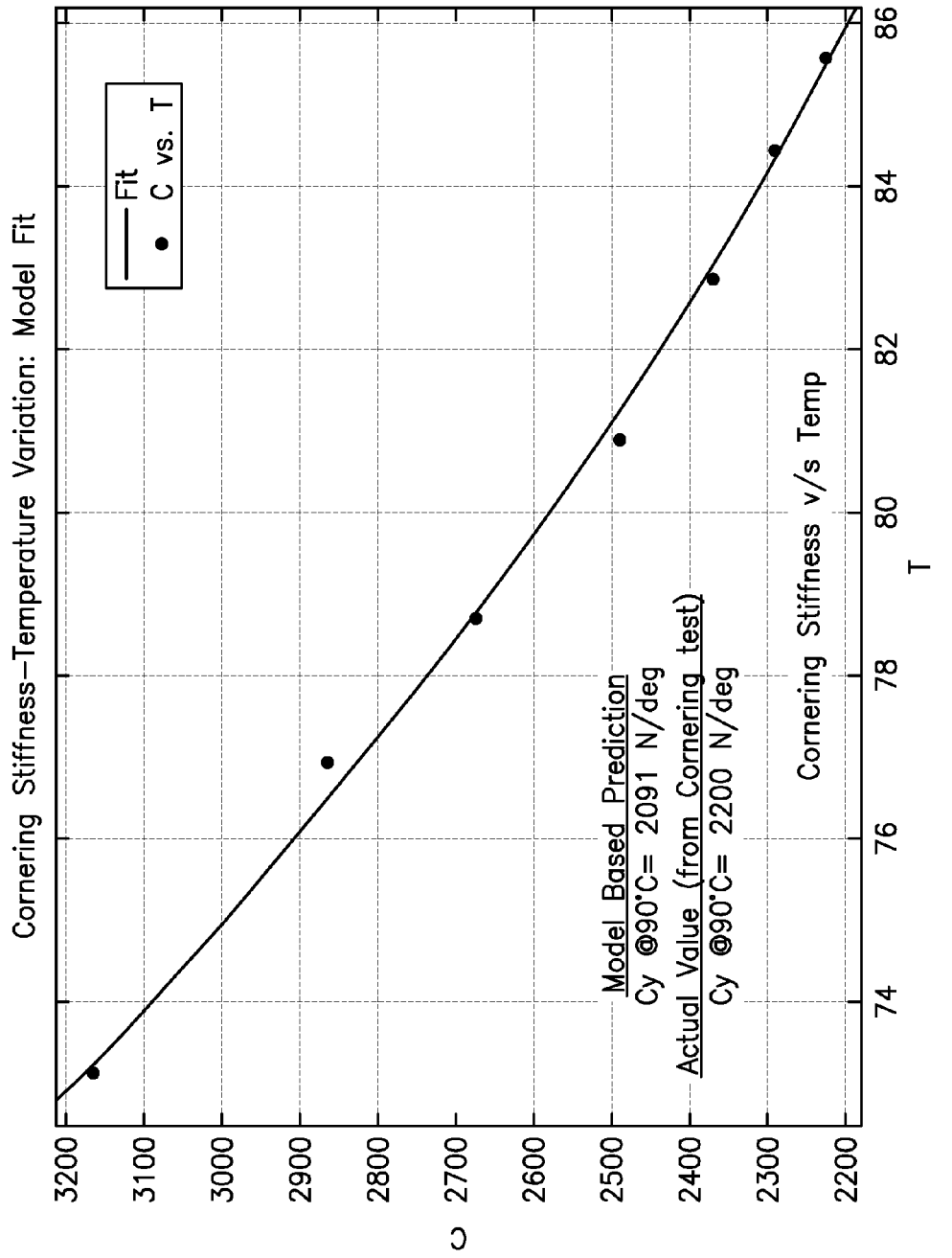
FIG. 17 is a graph showing cornering stiffness temperature variation model fit.

The fit of the model to the experimental peak Mu vs. temperature results is shown in FIG. 16 in which:
Coefficients (with 95% confidence bounds) are:
p1=−0.0003365 (−0.0006418, −3.125e−05)
p2=0.04719 (−0.001369, 0.09576)
p3=−0.4351 (−2.362, 1.492)
The fit of the model to the experimental cornering stiffness vs. temperature results is shown in FIG. 17 in which:
Coefficients (with 95% confidence bounds):
p1=1.761 (0.04273, 3.48)
p2=−356.5 (−629.8, −83.09)
p3=1.983e+04 (8978, 3.067e+04)

The model based prediction of peak grip $\mu_{peak}$ at 90° C. was 1.08 while the actual value from the cornering test was approximately 1.05. The model thus provided good fit against the actual results experimentally obtained. FIG. 17 shows the model fit for cornering stiffness from the cornering stiffness temperature variation test summarized above. The model based prediction of cornering stiffness Cy at 90° C. was 2091 N/deg while the actual value from the test was 2200 N/deg.

Figure 18A:
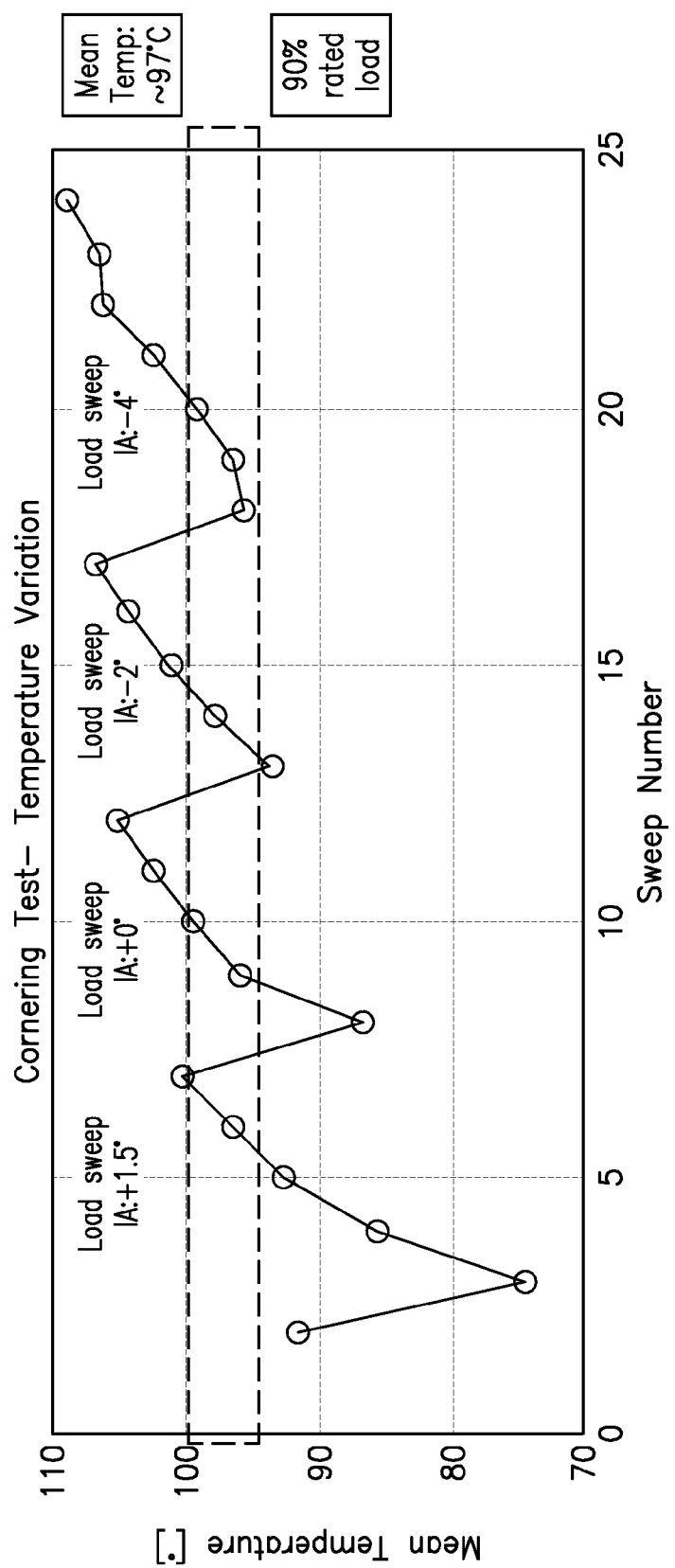
FIG. 18A is a graph showing cornering temperature variation through a series of load sweeps.
Figure 18B:
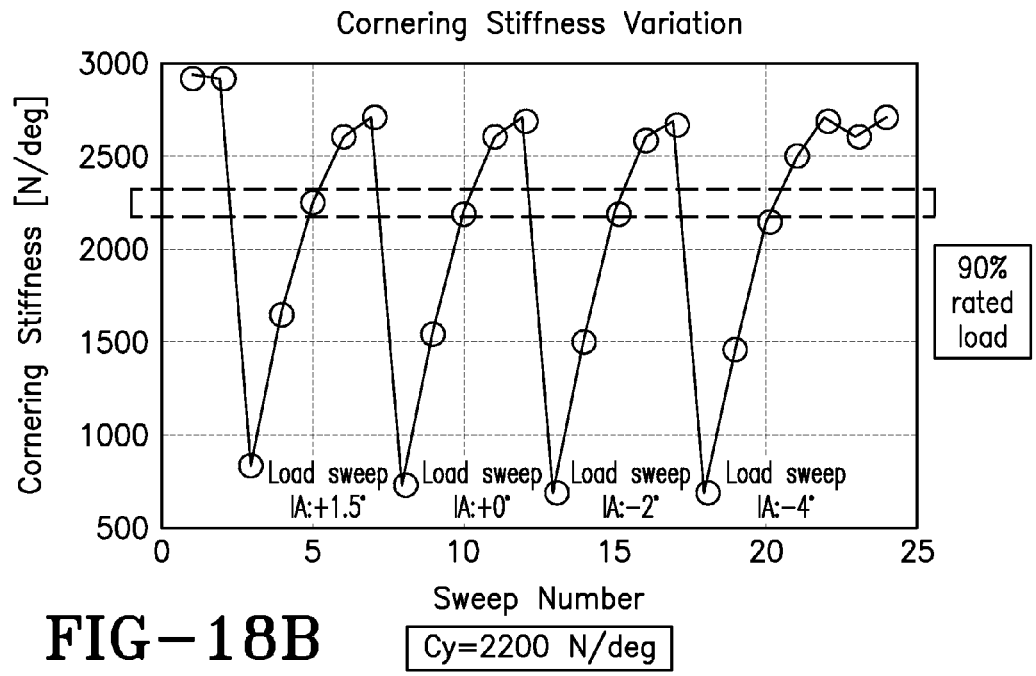
FIGS. 18B and 18C are graphs respectively showing cornering stiffness variation and peak grip level variation through a series of load sweeps.
Figure 18C:
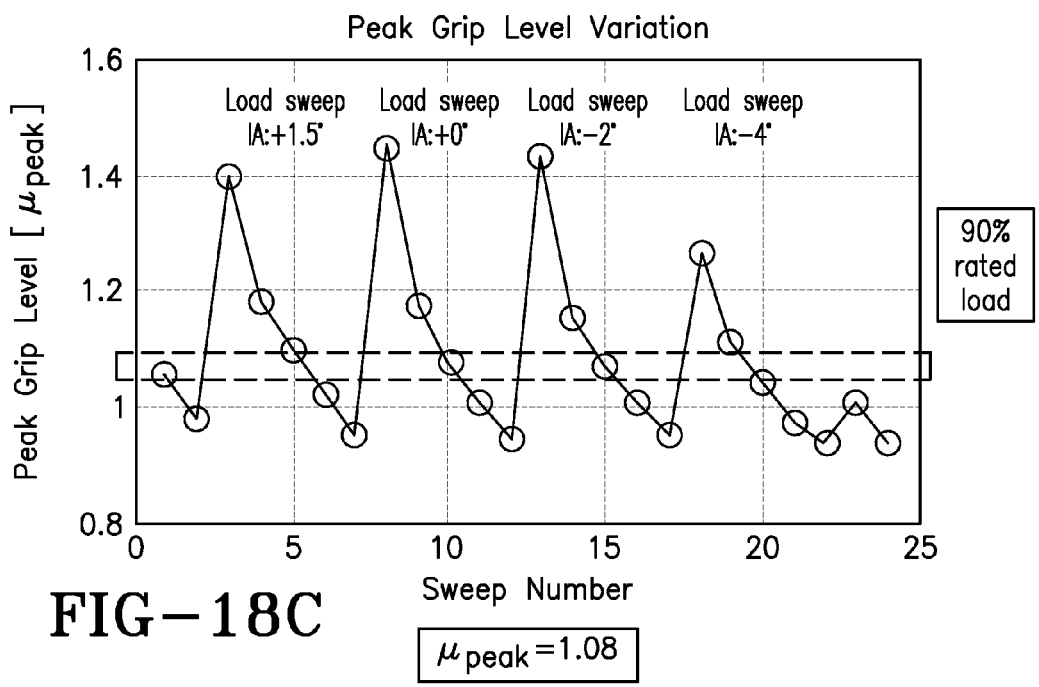

FIG. 18A gives cornering test results for the rear tire P285/35R20 on the Mustang GT500 test vehicle. The mean temperature of approximately 97° Celsius at 90 percent rated load was measured throughout the sweep iterations. Cornering stiffness variation and peak grip level variation results at 90 percent rated load for the rear tire are shown in FIGS. 18B and 18C, respectively. The cornering stiffness Cy was determined to be 2200 N/deg and the peak grip level $\mu_{peak}$=1.08.

Figure 19A:
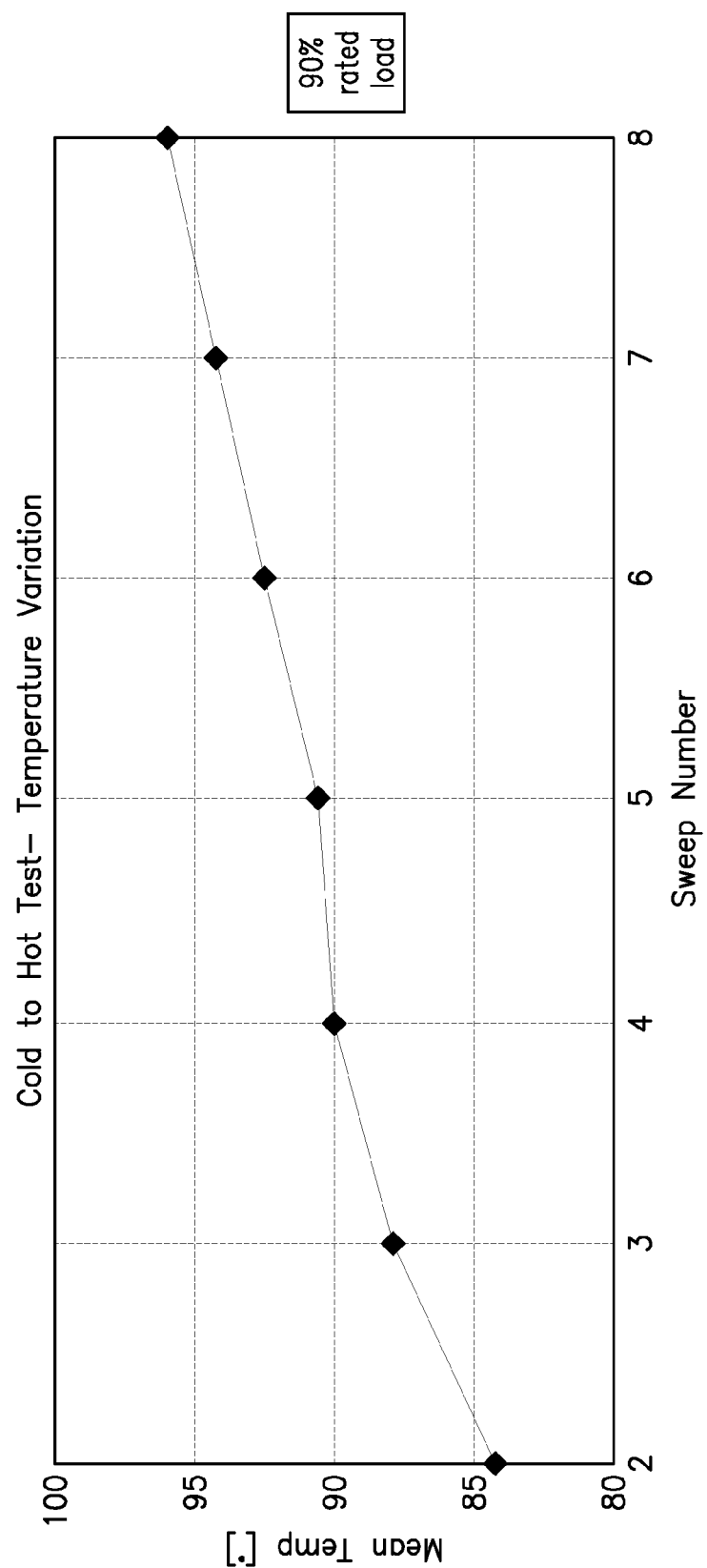
FIGS. 19A through 19C are graphs respectively showing cold to hot test results for temperature, cornering stiffness and peak grip level variations.
Figure 19B:
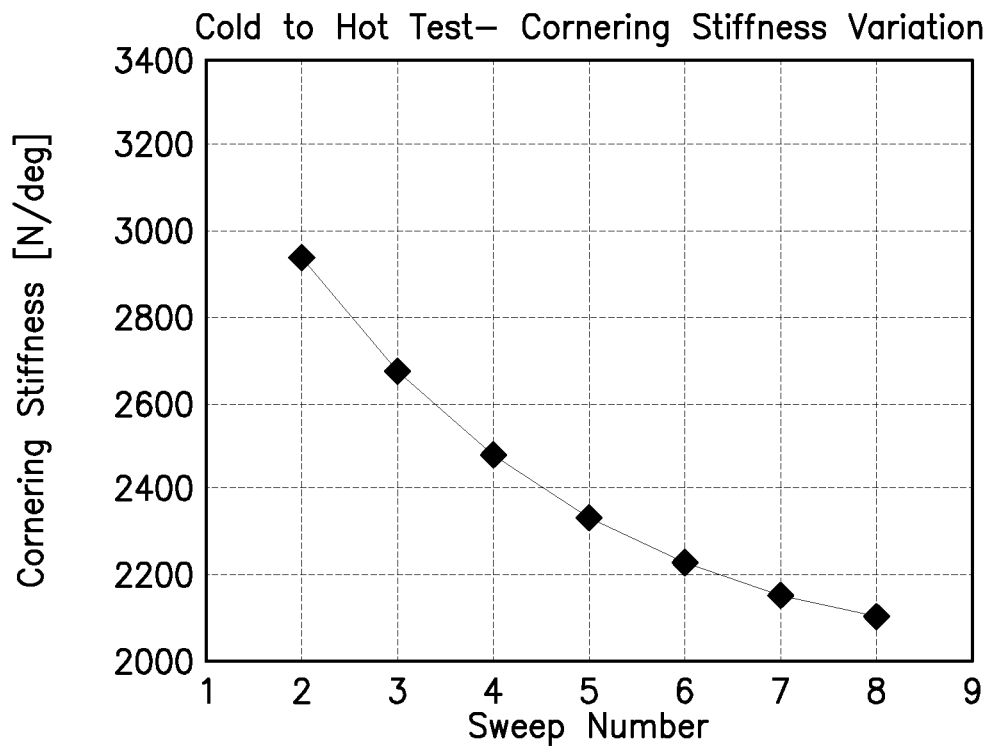
Figure 19C:
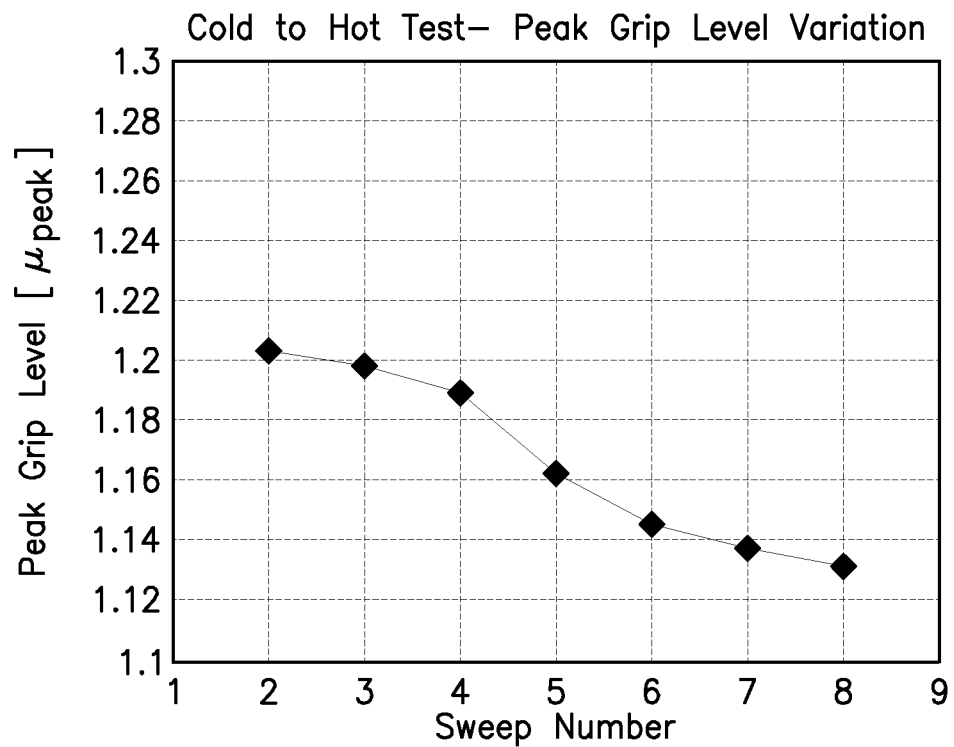
Figure 20:
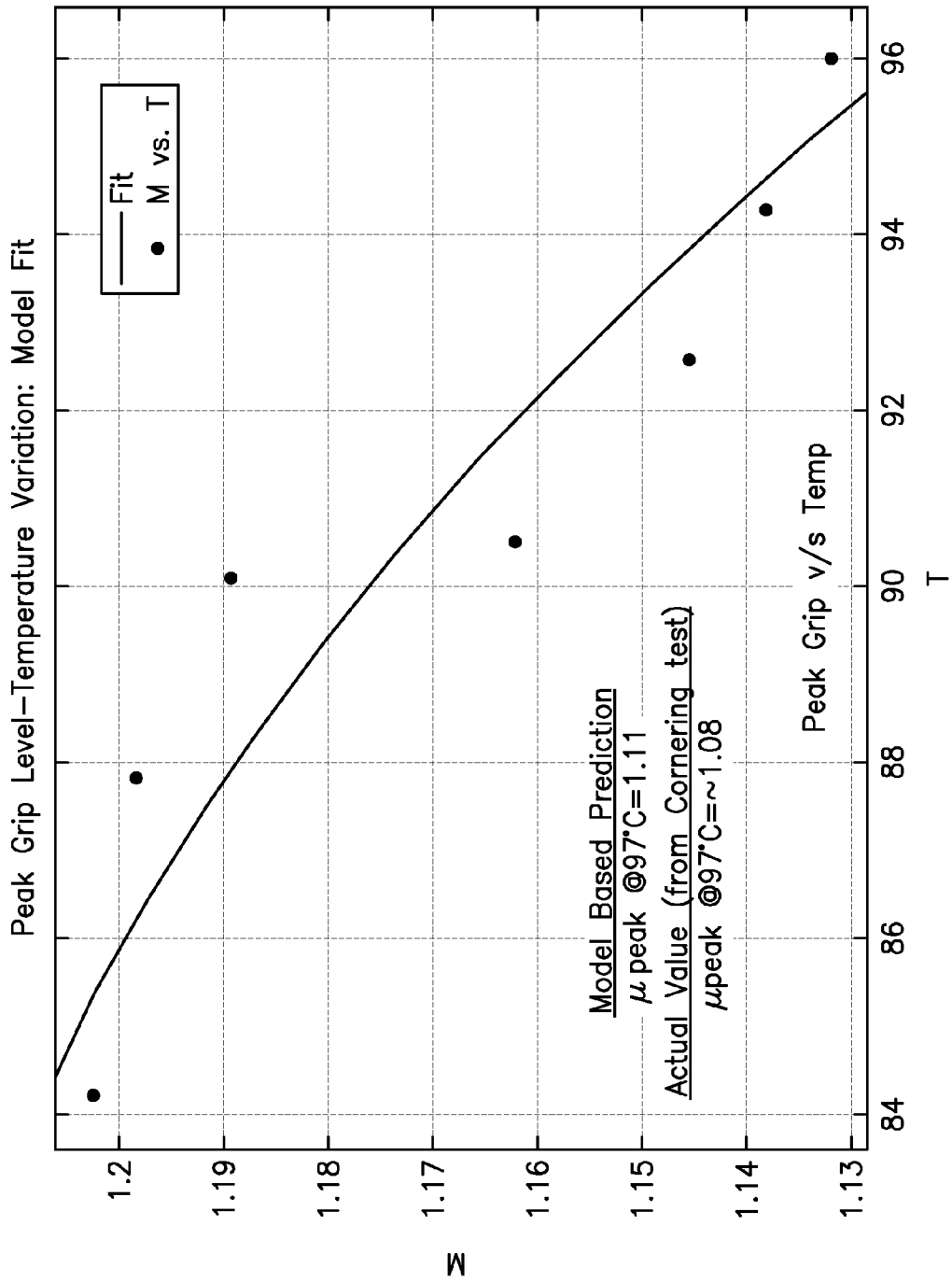
FIG. 20 is a graph showing peak grip level temperature variation model fit.
Figure 21:
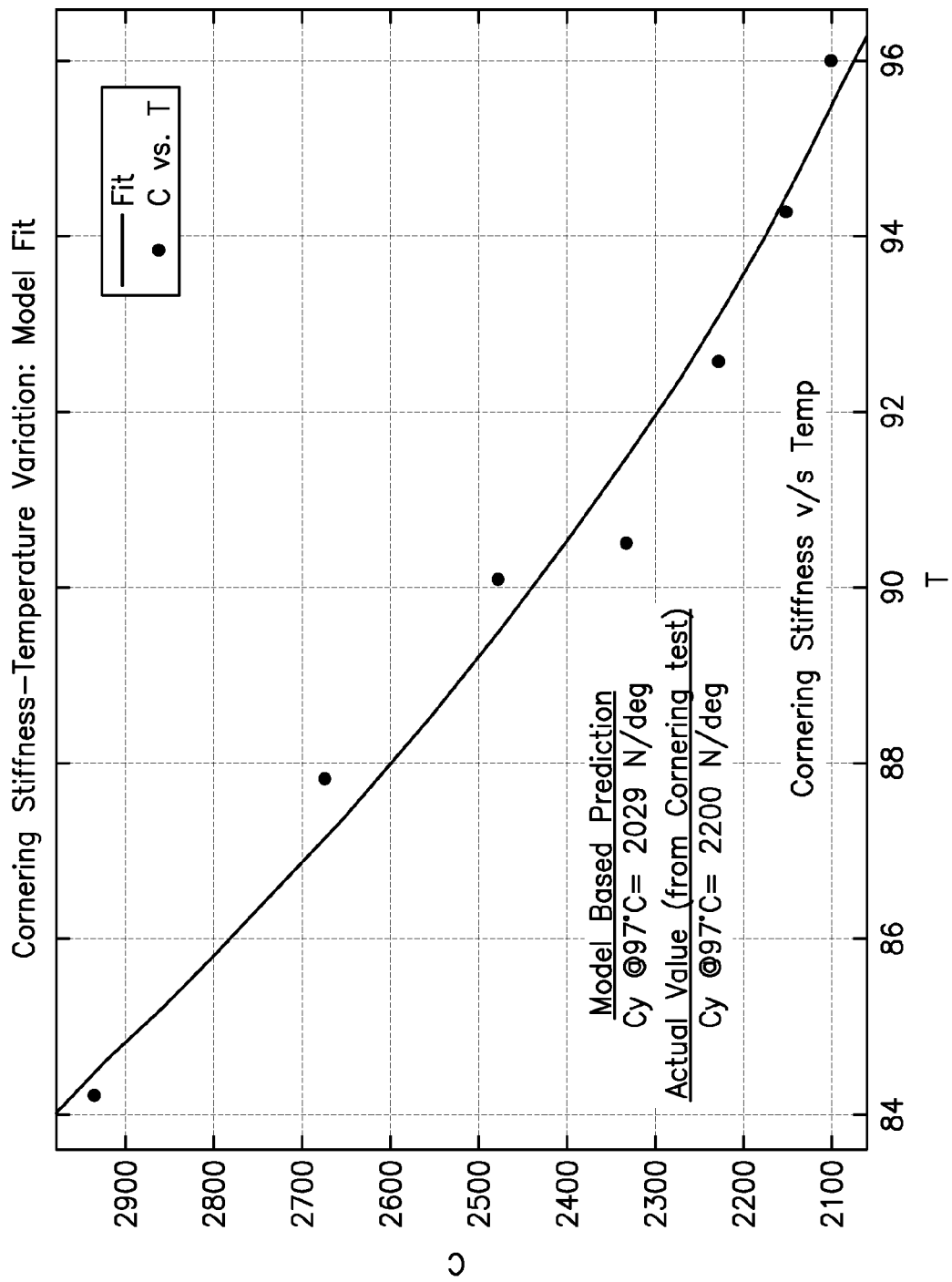
FIG. 21 is a graph showing cornering stiffness temperature variation model fit.

Results from a cold to hot test on the rear tire are shown in FIGS. 19A through 19C. FIG. 19A shows mean temperature throughout the test sweep at 90 percent, FIG. 19B shows cornering stiffness variation and FIG. 19C peak grip level variation. In FIG. 20, the peak grip level temperature variation model fit is shown, the model based prediction at 97° C. yielding a predicted 1.11 against actual value from the cornering test of approximately 1.08. FIG. 21 shows the cornering stiffness temperature variation model fit. A predicted cornering stiffness of 2029 N/deg compares favorably to the actual value of 2200 N/deg, indicating an acceptable fit.

From the tests conducted, the novel algorithm proposed that adapts the tire cornering stiffness parameter and the peak grip level parameter to tire temperature is validated. The tire temperature at the tire surface temperature, as measured using a tread based sensor module unit, is effective in adapting tire cornering stiffness and peak grip level parameter values. An embedded temperature measuring sensor or multiple sensors may be used or other suitable available sensor configuration.

The tire cornering stiffness and the peak grip level is estimated by using a polynomial model (second-order) reproduced below, capturing the dependencies of these parameters to tire surface temperature. The availability of the high fidelity tire model with temperature adaptation terms facilitates the online computation of optimized control commands such as active front/rear steering input and yaw control. Vehicle stability is thereby achieved without degrading driver intentions.

$$f(x)=p1*x^2+p2*x+p3$$

where p1, p2 & p3 are the model coefficients

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire-based system for adapting the calculation of temperature-sensitive tire cornering stiffness comprising:
    at least one tire mounted to a wheel hub and supporting a vehicle;
    at least one temperature sensor mounted to the one tire for measuring a tire temperature at a tire radially outward surface;
    an algorithmic model operatively receiving the tire temperature as an input and using the tire temperature in adapting a temperature-sensitive tire cornering stiffness;
    the algorithmic model comprising a second-order polynomial model capturing the dependency of the cornering stiffness to the tire temperature and estimating the tire cornering stiffness at the tire temperature; and
    a vehicle control system for using the temperature-sensitive tire cornering stiffness adapted by the tire temperature in at least one operative control command for the vehicle.

2. The system of claim 1, wherein the at least one temperature sensor comprises one of a plurality of temperature sensors mounted to respective locations across a tire tread region, and the tire temperature is determined from a tire temperature combination of average measured temperatures from the plurality of temperature sensors.

3. The system of claim 2, wherein the at least one temperature sensor substantially continuously measures tire temperature at the tire radially outward surface throughout operative use of the at least one tire.

4. The system of claim 1, wherein the at least one operative control command for the vehicle is from the group: active front and rear steering and yaw control.

5. A tire-based system for adapting the calculation of temperature-sensitive tire peak grip level comprising:
    at least one tire mounted to a wheel hub and supporting a vehicle;
    at least one tire-mounted temperature sensor mounted to the one vehicle tire for measuring a tire temperature at a radially outward surface of the one vehicle tire;
    an algorithmic model operatively receiving the tire temperature as an input and using the tire temperature in adapting a temperature-sensitive tire peak grip level;
    the algorithmic model comprising a second-order polynomial model capturing the dependency of the peak grip level to the tire temperature and estimating the tire peak grip level at the tire temperature; and
    vehicle controls using the temperature-sensitive tire peak grip level adapted by the temperature of the at least one vehicle tire in at least one vehicle control command.

6. The system of claim 5, wherein the at least one temperature sensor comprises one of a plurality of temperature sensors mounted to respective locations across a tire tread region, and the tire temperature is determined from a tire temperature combination of average measured temperatures from the plurality of temperature sensors.

7. The system of claim 5, wherein the at least one temperature sensor substantially continuously measures tire temperature at the tire radially outward surface throughout operative use of the at least one tire.

8. The system of claim 5, wherein the at least one operative control command for the vehicle is from the group: active front and rear steering and yaw control.

9. A tire-based method for adapting the calculation of temperature-sensitive tire characteristics comprising:
    mounting at least one tire-mounted temperature sensor to a vehicle tire for measuring a tire temperature at a radially outward tire surface;
    employing an algorithmic model to adapt at least one of a temperature-sensitive tire cornering stiffness and a tire peak grip level by the tire temperature at the outward tire surface;

operatively receiving the tire temperature as an input in the algorithmic model and using the tire temperature in adapting the at least one of the tire cornering stiffness and the peak grip level;

capturing the dependency of the at least one of the tire cornering stiffness and the peak grip level to the tire temperature with a second-order polynomial model in the algorithmic model;

estimating the at least one of the tire cornering stiffness and the peak grip level at the tire temperature; and using the at least one of the tire cornering stiffness and the peak grip level adapted by the tire temperature at the outward tire surface in at least one vehicle control command.

10. The method of claim 9, further comprising mounting a plurality of temperature sensors to respective locations across a tire tread region, and combining by average tire temperature measurements for use in the algorithmic model.

11. The method of claim 9, wherein the at least one vehicle control command is from the group: active front and rear steering and yaw control.

\* \* \* \* \*